(12) United States Patent
Bao et al.

(10) Patent No.: US 11,711,782 B2
(45) Date of Patent: Jul. 25, 2023

(54) ANCHOR SELECTION FOR UE POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/482,844

(22) Filed: Sep. 23, 2021

(65) Prior Publication Data
US 2022/0110088 A1 Apr. 7, 2022

Related U.S. Application Data

(60) Provisional application No. 63/088,774, filed on Oct. 7, 2020.

(51) Int. Cl.
*H04W 64/00* (2009.01)
*H04L 5/00* (2006.01)
(Continued)

(52) U.S. Cl.
CPC ........ *H04W 64/006* (2013.01); *H04B 17/318* (2015.01); *H04B 17/336* (2015.01); *H04L 5/0048* (2013.01); *H04W 24/10* (2013.01)

(58) Field of Classification Search
CPC .... H04W 64/006; H04W 24/10; H04B 17/24; H04B 17/318; H04B 17/336; H04B 17/27; H04L 5/0048; H04L 5/0094
See application file for complete search history.

(56) References Cited

U.S. PATENT DOCUMENTS

| 11,019,457 | B2 * | 5/2021 | Lee ..................... H04W 4/029 |
| 2019/0239181 | A1 * | 8/2019 | Gangakhedkar ...... H04W 76/10 |

(Continued)

FOREIGN PATENT DOCUMENTS

| WO | 2020028517 A1 | 2/2020 |
| WO | 2020067964 A1 | 4/2020 |

OTHER PUBLICATIONS

Chen, C-H., et al., "Enhanced Distance and Location Estimation for Broadband Wireless Networks", IEEE Transactions on Mobile Computing, IEEE Service Center, Los Alamitos, CA, US, vol. 14, No. 11, Nov. 1, 2015 (Nov. 1, 2015), XP011670579, pp. 2257-2271, ISSN: 1536-1233, DOI: 10.1109/TMC.2015.2398419 [retrieved on Sep. 30, 2015] the whole document.

(Continued)

*Primary Examiner* — Siu M Lee
(74) *Attorney, Agent, or Firm* — SUNSTEIN LLP/Qualcomm

(57) ABSTRACT

A positioning reference signal measurement reporting method includes: determining, at a UE based on at least one signal received by the UE, an indication of a spatial relationship between the UE and a first candidate anchor device that is configured to transmit a positioning reference signal (PRS) wirelessly; and reporting a measurement of the PRS based on the indication of the spatial relationship between the UE and the first candidate anchor device meeting at least one criterion of anchor device quality.

29 Claims, 13 Drawing Sheets

(51) Int. Cl.
    *H04B 17/318*     (2015.01)
    *H04B 17/336*     (2015.01)
    *H04W 24/10*     (2009.01)

(56) References Cited

U.S. PATENT DOCUMENTS

| | | | | |
|---|---|---|---|---|
| 2020/0137714 | A1* | 4/2020 | Kumar | H04W 72/046 |
| 2021/0190930 | A1* | 6/2021 | Wang | G01S 5/0018 |
| 2021/0377697 | A1 | 12/2021 | Yerramalli et al. | |
| 2022/0385423 | A1* | 12/2022 | Ko | H04W 52/383 |

OTHER PUBLICATIONS

International Search Report and Written Opinion—PCT/US2021/051946—ISA/EPO—dated Jan. 5, 2022.

* cited by examiner

1300

1310 — Transmitting, from a network entity, a positioning reference signal message to a target user equipment based on one or more spatial relationships between the target user equipment and one or more first anchor devices meeting one or more criteria of anchor device quality, the positioning reference signal message comprising a request for the target user equipment to report one or more positioning reference signal measurements corresponding to one or more positioning reference signals corresponding to one or more first anchor devices, or a positioning reference signal schedule of positioning reference signal exchange between the target user equipment and the one or more first anchor devices, or a combination thereof

FIG. 13

ANCHOR SELECTION FOR UE POSITIONING

CROSS-REFERENCE TO RELATED APPLICATIONS

This application claims the benefit of U.S. Provisional Application No. 63/088,774, filed Oct. 7, 2020, entitled "ANCHOR SELECTION FOR UE POSITIONING," which is assigned to the assignee hereof, and the entire contents of which are hereby incorporated herein by reference.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example user equipment (UE) includes: an interface; a memory; and a processor communicatively coupled to the interface and the memory and configured to: determine, based on at least one signal received via the interface, an indication of a spatial relationship between the UE and a first candidate anchor device that is configured to transmit a positioning reference signal (PRS) wirelessly; and report a measurement of the PRS based on the indication of the spatial relationship between the UE and the first candidate anchor device meeting at least one criterion of anchor device quality.

An example positioning reference signal measurement reporting method includes: determining, at a UE based on at least one signal received by the UE, an indication of a spatial relationship between the UE and a first candidate anchor device that is configured to transmit a positioning reference signal (PRS) wirelessly; and reporting a measurement of the PRS based on the indication of the spatial relationship between the UE and the first candidate anchor device meeting at least one criterion of anchor device quality.

Another example UE includes: means for determining, based on at least one signal received by the UE, an indication of a spatial relationship between the UE and a first candidate anchor device that is configured to transmit a PRS wirelessly; and means for reporting a measurement of the PRS based on the indication of the spatial relationship between the UE and the first candidate anchor device meeting at least one criterion of anchor device quality.

A non-transitory, processor-readable storage medium includes processor-readable instructions configured to cause a processor, of a UE, to: determine, based on at least one signal received by the UE, an indication of a spatial relationship between the UE and a first candidate anchor device that is configured to transmit a PRS wirelessly; and report a measurement of the PRS based on the indication of the spatial relationship between the UE and the first candidate anchor device meeting at least one criterion of anchor device quality.

An example network entity includes: an interface; a memory; and a processor communicatively coupled to the interface and the memory and configured to transmit a positioning reference signal message to a target user equipment via the interface based on one or more spatial relationships between the target user equipment and one or more first anchor devices meeting one or more criteria of anchor device quality, the positioning reference signal message comprising a request for the target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof.

An example method for use in positioning a user equipment includes: transmitting, from a network entity, a positioning reference signal message to a target user equipment based on one or more spatial relationships between the target user equipment and one or more first anchor devices meeting one or more criteria of anchor device quality, the positioning reference signal message comprising a request for the target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof.

Another example network entity includes: means for determining a positioning reference signal message comprising a request for a target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof; and means for transmitting the positioning reference signal message to the target user equipment based on one or more spatial relationships between the target user equipment and the one or more first anchor devices meeting one or more criteria of anchor device quality.

Another example non-transitory, processor-readable storage medium includes processor-readable instructions configured to cause a processor, of a network entity, to: transmit a positioning reference signal message to a target user equipment based on one or more spatial relationships between the target user equipment and one or more first anchor devices meeting one or more criteria of anchor device quality, the positioning reference signal message comprising a request for the target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof.

BRIEF DESCRIPTION OF THE DRAWINGS

FIG. 13 is a block diagram of a method for use in positioning a user equipment.

DETAILED DESCRIPTION

Figure 1:
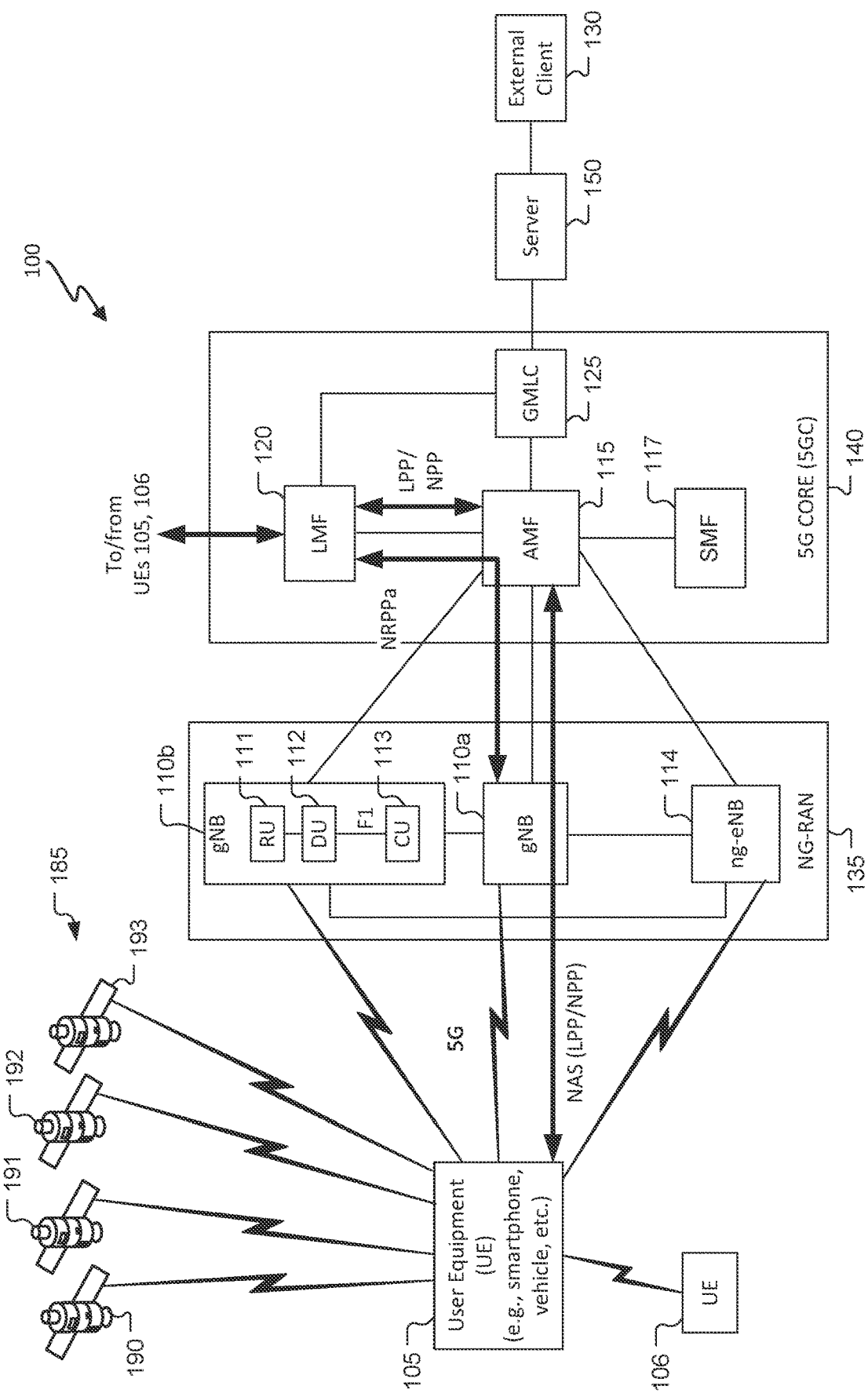
FIG. 1 is a simplified diagram of an example wireless communications system.

Techniques are discussed herein for selecting and using one or more anchors for positioning of a target user equipment (UE). For example, one or more anchors may be selected for using one or more corresponding signal measurements to determine position information for a target UE. The anchor(s) may be selected based on distance from the target UE. For example, the measurement(s) for (e.g., measurement(s) of signal(s) from or measurement(s) by) the anchor(s) that are furthest from the target UE may be used for positioning. The distance(s) may be determined and/or inferred from one or more signal measurement values, e.g., values of time of arrival (ToA), pathloss, reference signal received power (RSRP), signal-to-noise ratio (SNR), and/or signal-to-interference-plus-noise ratio (SINR). As another example, measurement(s) for anchor(s) with measurement values above or below a threshold (e.g., above a ToA threshold, above a pathloss threshold, below an RSRP threshold, below an SNR threshold, and/or below a SINR threshold) may be used for positioning. As another example, measurement(s) for specified anchor(s) may be used. The anchor(s) may be specified by a network entity, e.g., based on the distance from the target UE to the respective anchor, e.g., as determined by the network entity from signal measurement(s) and/or indications of location. As another example, the target UE may request scheduling of one or more reference signals to/from one or more specific anchors. The anchor(s) selected may be based on effect on positioning accuracy, e.g., an improvement to a geometric dilution of positioning (GDOP) estimate by adding an anchor to an existing set of anchors, or a GDOP expected from a set of candidate anchors (e.g., compared to another set of candidate anchors). Other examples, however, may be implemented.

Items and/or techniques described herein may provide one or more of the following capabilities, as well as other capabilities not mentioned. Positioning accuracy may be improved. Power consumption and/or signal interference may be reduced for positioning of a target UE, possibly without reducing positioning accuracy or possibly while improving positioning accuracy. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
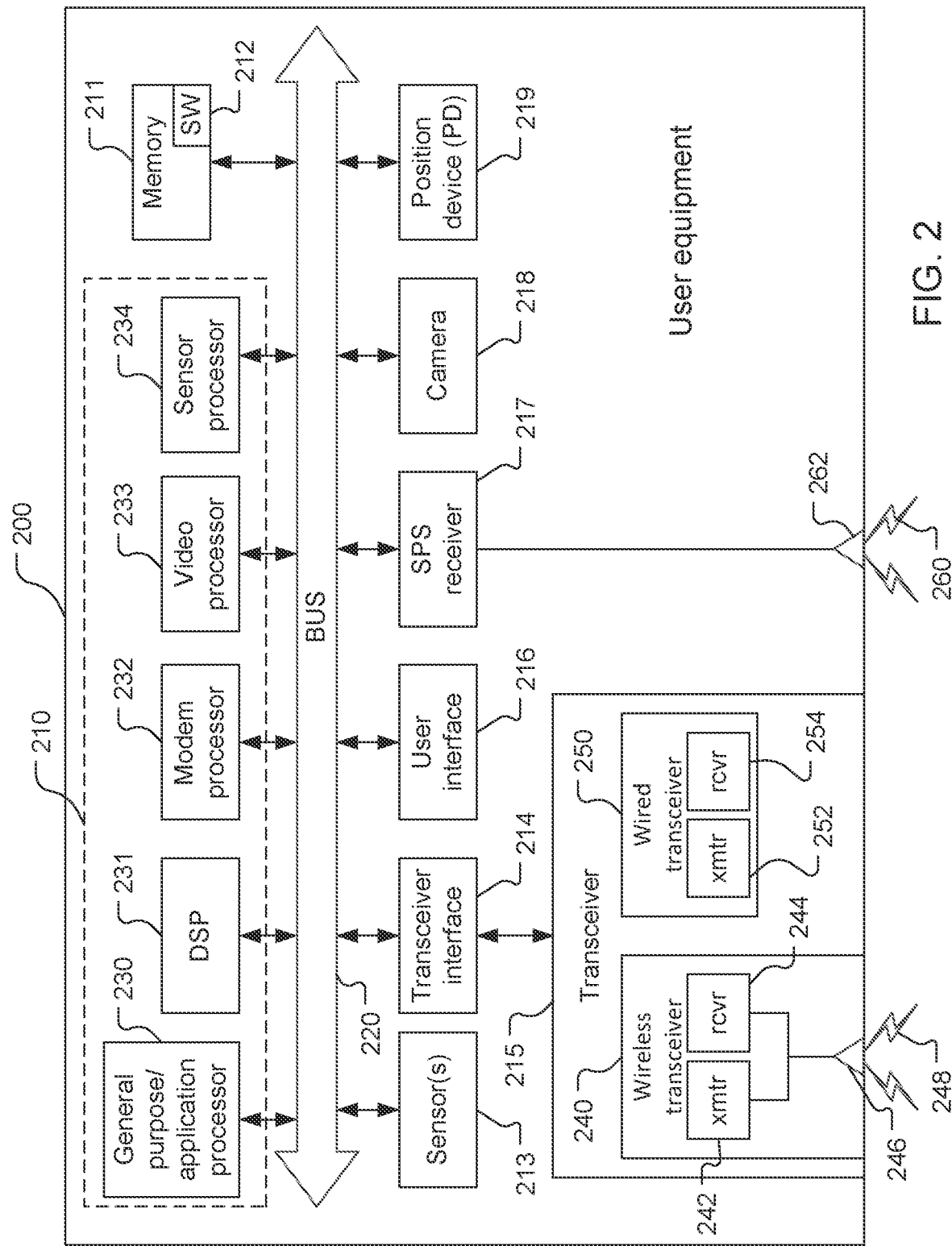
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be unconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
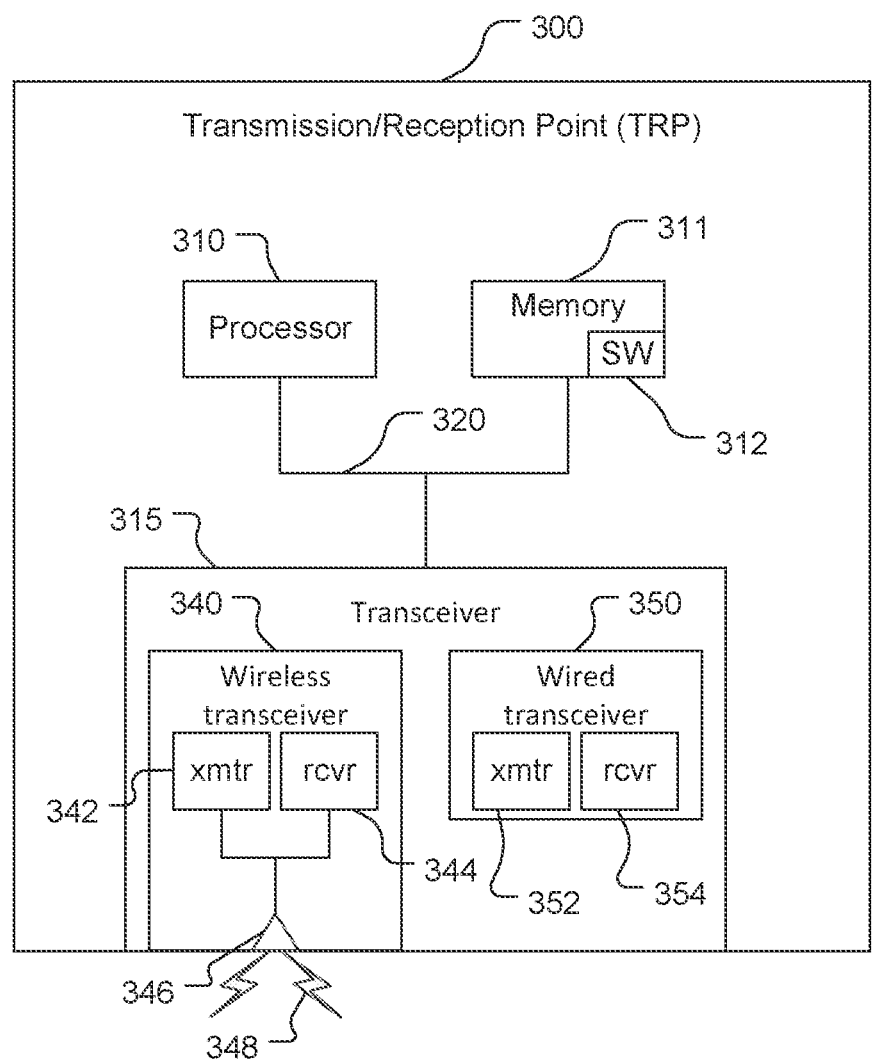
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
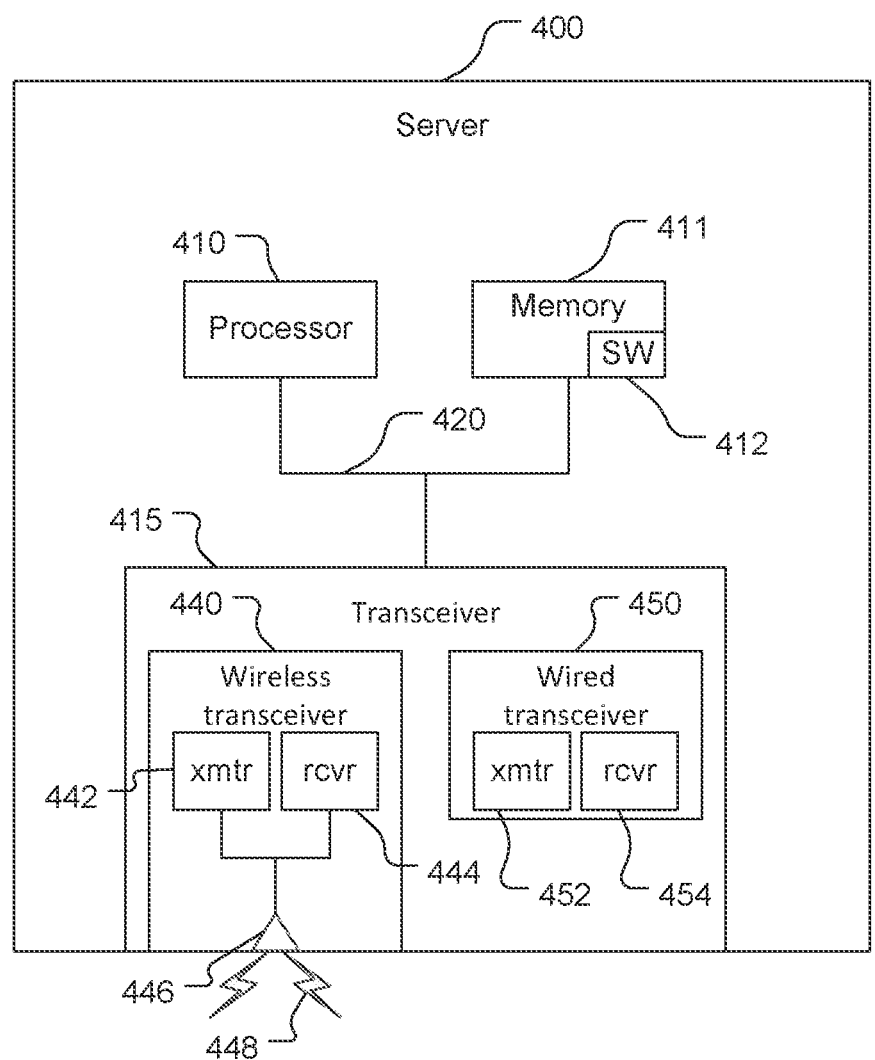
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T mms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 mess of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

UE Positioning with Anchor(s)

Figure 5:
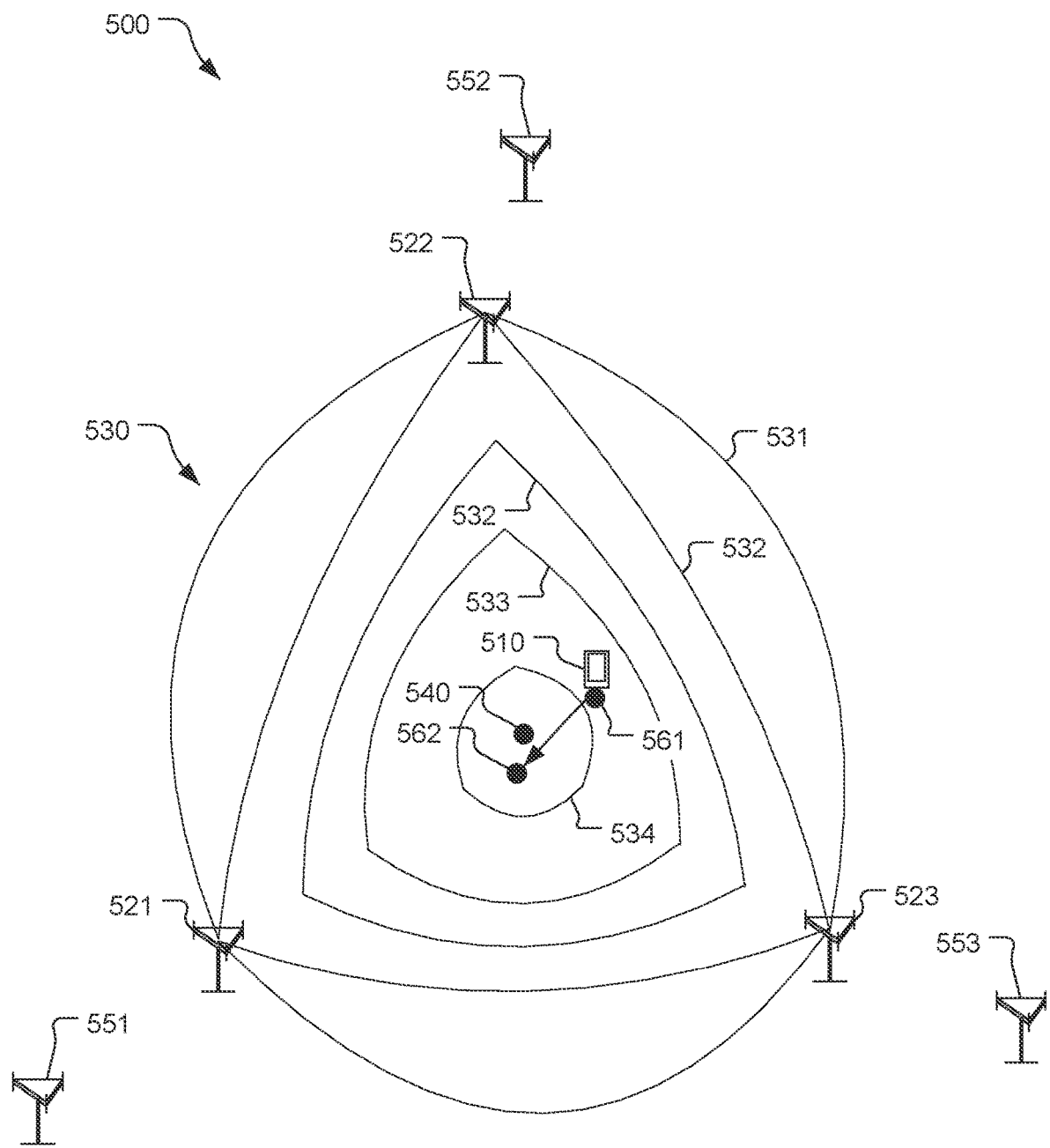
FIG. 5 is a simplified diagram of effective centering of a user equipment in a geometric dilution of positioning pattern based on different anchor devices.

Referring to FIG. 5, with further reference to FIGS. 1-4, a system 500 includes a target UE 510, and anchor devices 521, 522, 523, here shown as TRPs (e.g., gNBs). Each of the anchor devices 521-523 may be an example of the TRP 300. Anchor devices are configured to transfer PRS with a target UE and have locations that are known/obtained and/or determinable independently of the PRS transferred with the target UE, e.g., by an entity that will determine location of the target UE. The target UE 200 may be an example of the UE 510, and the target UE 510 may take any of a variety of forms. For example, the target UE 510 is shown as a smartphone, but other forms of UEs may be used. Further, the anchor devices 521-523 may be other forms of anchor devices (also called anchor points or anchors) such as a smartphone, or a vehicle (e.g., a car), or an unoccupied aerial vehicle (UAV, e.g., a drone), although other forms of anchor devices may be used. The target UE 510 may be configured to send and/or receive reference signals to and/or from the anchors 521-523 to help determine a position of the target UE 510, e.g., by measuring reference signals from one or more of the anchors 521-523 and/or providing reference signals (e.g., SRS for positioning, also called UL-PRS, SL-PRS) to the anchors 521-523 for measurement. Use of the anchors 521-523 can provide geometric dilution of precision values, of position estimates, that decrease with proximity to a center 540 of a GDOP pattern 530 provided by the set of the anchors 521-523, i.e., positioning accuracy increases moving toward the center 540 of the GDOP pattern 530 provided by the set of the anchors 521-523. Thus constant-GDOP lines 531, 532, 533, 534, 535 decrease in value moving toward the center 540. It has been found that using anchors that are further from the target UE 510 may effectively move the position estimate of the target UE 510 toward the center 540, and thus improve the GDOP and positioning accuracy. For example, instead of using the anchors 521-523, if anchors 551, 552, 553 were used, then a position estimate for the target UE 510 would effectively move from a location 561 to a location 562, with the location 562 being closer to the center 540 than the location 561. In general, a distance between devices may be derived from one or more signal measurements such as time of arrival (ToA), RSRP (reference signal received power), pathloss, SINR (signal-to-interference-plus-noise ratio), SNR (signal-to-noise ratio), etc.

Figure 6:
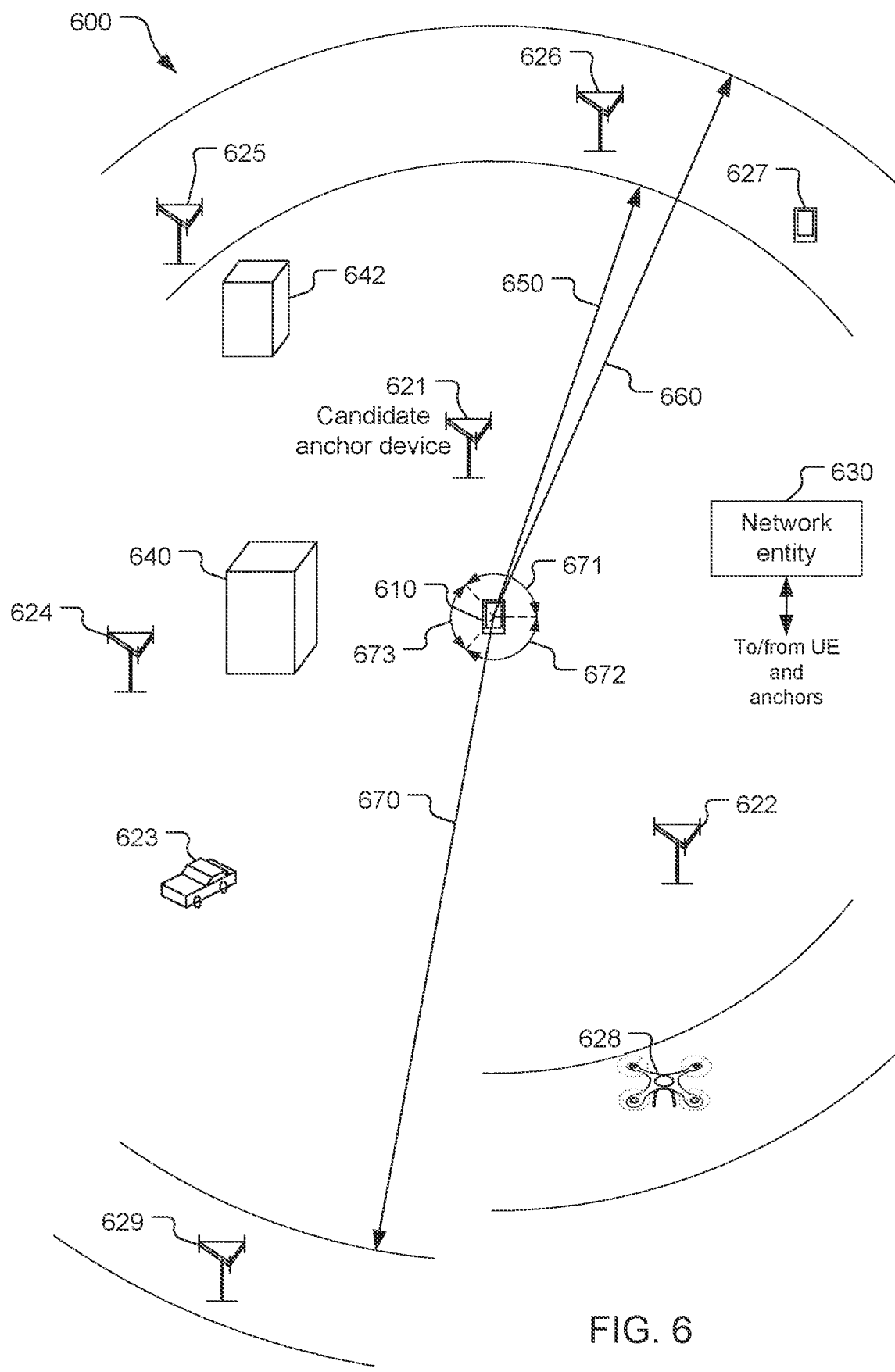
FIG. 6 is a simplified diagram of an environment including a user equipment and candidate anchor devices.

Referring also to FIG. 6, an example environment 600 includes a target UE 610, anchor devices 621, 622, 623, 624, a network entity 630, and a building 640. Anchor devices may be of any of a variety of forms, with forms of anchor devices shown in FIG. 6 being non-limiting examples. The network entity 630 may comprise a TRP 300 and/or a server 400 (e.g., an LMF). The network entity 630 may be configured to select one or more anchor devices for use with the target UE 610 to determine position information (e.g., one or more reference signal measurements, one or more ranges (e.g., pseudoranges), and/or one or more position estimates, etc.). Also or alternatively, the network entity 630 may be configured to request or require one or more measurements from the target UE 610 to satisfy one or more criteria, e.g., criteria based on a desirability of anchor devices to be far from the target UE 610. The target UE 610 may be configured to report one or more reference signal measurements to attempt to improve positioning accuracy, e.g., reduce GDOP. For example, the target UE 610 may be configured to transfer reference signals with anchor devices that are a minimum distance from the target UE 610, and/or that help center the target UE 610 in a GDOP pattern provided by the anchors. Anchor devices to be used for signal transfer and reporting may, for example, be selected based on a likelihood that an anchor device or a set of anchor devices will be good for position determination (e.g., provide a desired positioning accuracy for the target UE 610). For example, the anchor device(s) may be selected based on the anchor device(s) being disposed far from the target UE 610, based on a contribution to acceptable GDOP, based on an ability to improve GDOP relative to a presently-used anchor device or set of anchor devices, etc. The target UE 610 and/or the network entity 630 may be configured to determine whether each anchor device 621-624 is line of sight (LOS) with respect to the target UE 610 and may use this information to determine or help to determine whether to use a particular anchor device for positioning of the target UE 610. For example, the building 640 may render the target UE 610 and the anchor device 624 NLOS (non-line of sight), which may result in the anchor device 624 not being used (at least while NLOS with respect to the target UE 610) for signal transfer with the target UE 610 for positioning.

Figure 7:
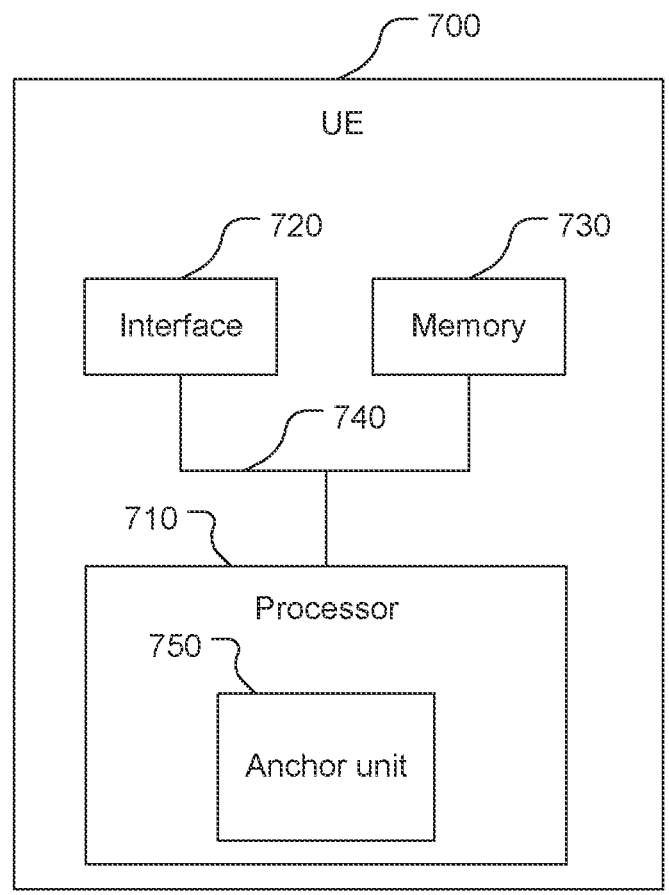
FIG. 7 is a block diagram of an example user equipment.

Referring to FIG. 7, with further reference to FIGS. 1-6, a target UE 700, of which the target UE 510 and/or the target UE 610 may be an example, includes a processor 710, an interface 720, and a memory 730 communicatively coupled to each other by a bus 740. The target UE 700 may include some or all of the components shown in FIG. 7, and may include one or more other components such as any of those shown in FIG. 2 such that the UE 200 may be an example of the target UE 700. The processor 710 may include one or more components of the processor 210. The interface 720 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 720 may include the wired transmitter 252 and/or the wired receiver 254. The memory 730 may be configured similarly to the memory 211, e.g., including software with processor-readable instructions configured to cause the processor 710 to perform functions.

The description herein may refer to the processor 710 performing a function, but this includes other implementations such as where the processor 710 executes software (stored in the memory 730) and/or firmware. The description herein may refer to the target UE 700 performing a function as shorthand for one or more appropriate components (e.g., the processor 710 and the memory 730) of the target UE 700 performing the function. The processor 710 (possibly in conjunction with the memory 730 and, as appropriate, the interface 720) includes an anchor unit 750. The anchor unit 750 may be configured to select one or more anchor points, from candidate anchor points, for use in determining a position of the target UE 700, e.g., to send one or more reference signals to and/or receive one or more reference signals from the anchor(s), and measurement(s) of the reference signal(s) may be used to determine the position of the target UE 700. The anchor unit 750 may be configured to select the anchor device(s) to use in a variety of manners, e.g., as discussed further herein. The configuration and functionality of the anchor unit 750 is discussed further herein and the target UE 700 is configured to perform the functionality of the anchor unit 750.

Figure 8:
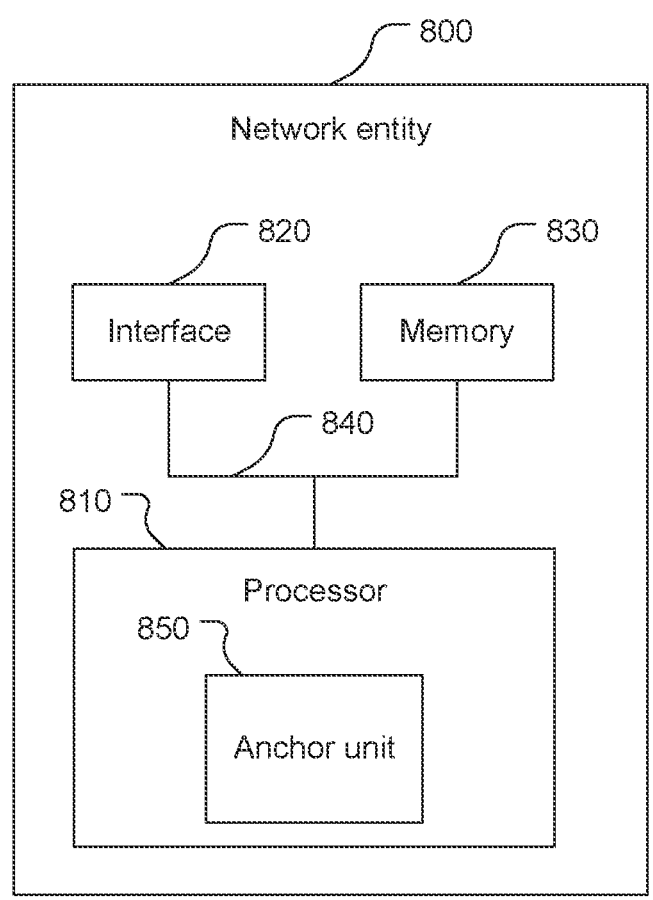
FIG. 8 is a block diagram of an example network entity.

Referring also to FIG. 8, network entity 800, of which the network entity 630, the TRP 300, and/or the server 400 may be an example, includes a processor 810, an interface 820, and a memory 830 communicatively coupled to each other by a bus 840. The network entity 800 may include some or all of the components shown in FIG. 8, and may include one or more other components such as any of those shown in FIG. 3 or FIG. 4. The interface 820 may include one or more of the components of the transceiver 315, e.g., the wireless transmitter 342 and the antenna 346, or the wireless receiver 344 and the antenna 346, or the wireless transmitter 342, the wireless receiver 344, and the antenna 346. Also or alternatively, the interface 820 may include the wired transmitter 352 and/or the wired receiver 354. Also or alternatively, the interface 820 may include one or more of the components of the transceiver 415, e.g., the wireless transmitter 442 and the antenna 446, or the wireless receiver 444 and the antenna 446, or the wireless transmitter 442, the wireless receiver 444, and the antenna 446. Also or alternatively, the interface 820 may include the wired transmitter 452 and/or the wired receiver 454. The memory 830 may be configured similarly to the memory 311 and/or the memory 411, e.g., including software with processor-readable instructions configured to cause the processor 810 to perform functions.

The description herein may refer to the processor 810 performing a function, but this includes other implementations such as where the processor 810 executes software (stored in the memory 830) and/or firmware. The description herein may refer to the network entity 800 performing a function as shorthand for one or more appropriate components (e.g., the processor 810 and the memory 830) of the network entity 800 performing the function. The processor 810 (possibly in conjunction with the memory 830 and, as appropriate, the interface 820) includes an anchor unit 850. The anchor unit 850 may be configured to select one or more anchor points for use in determining a position of the target UE 700, e.g., to schedule one or more reference signals to be sent to and/or received from the target UE 700, and/or to request and/or receive measurement(s) from the target UE 700 and/or other UEs that may be used to determine the position of the target UE 700. The anchor unit 850 may be configured to select the anchor device(s) to use in a variety of manners, e.g., as discussed further herein. The configuration and functionality of the anchor unit 850 is discussed further herein and the network entity 800 is configured to perform the functionality of the anchor unit 850.

Figure 9:
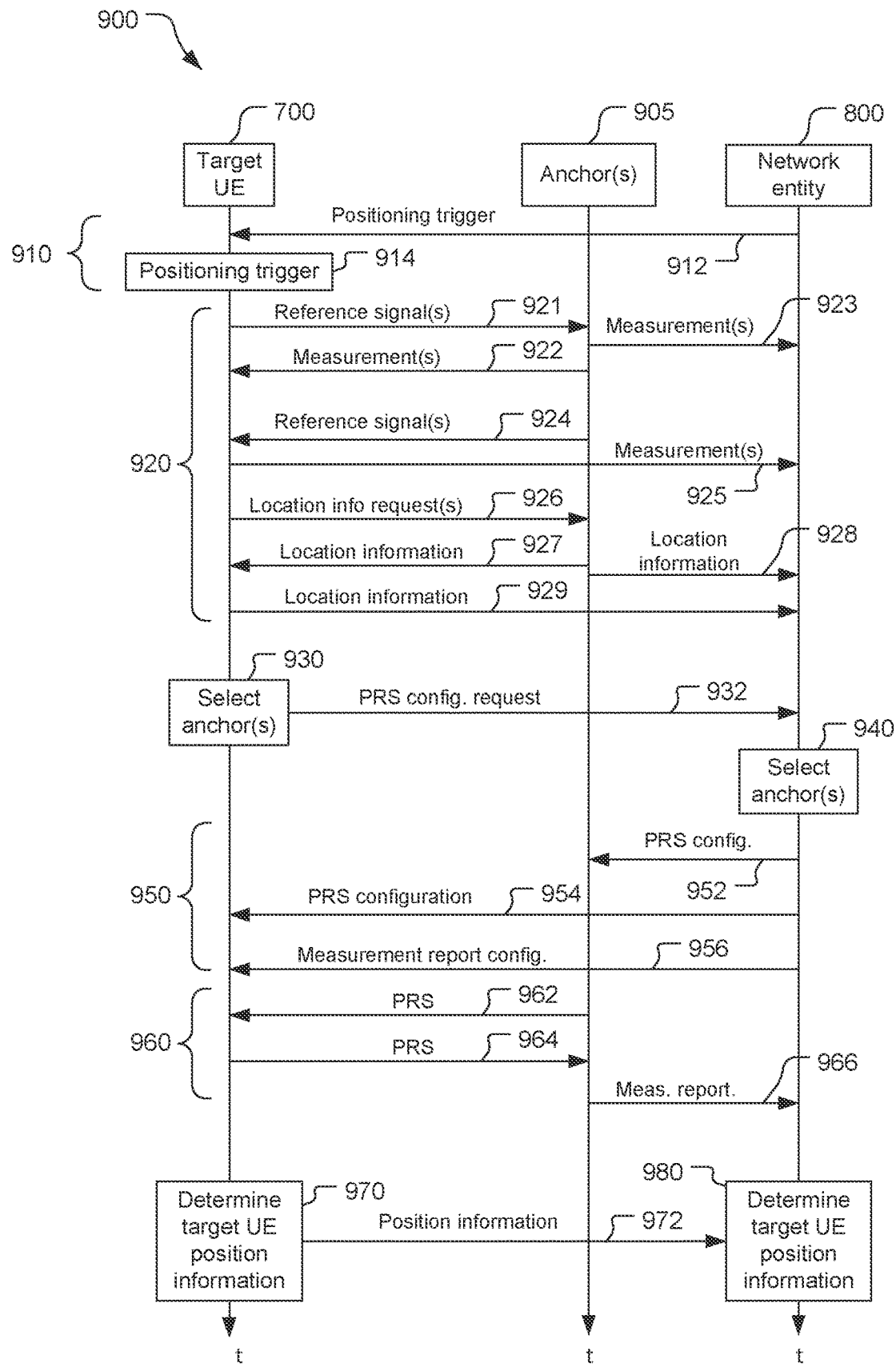
FIG. 9 is a processing and signal flow for determining position information.

Referring to FIG. 9, with further reference to FIGS. 1-8, a processing and signal flow 900 for determining position information includes the stages shown. The flow 900 is an example, and stages may be added to, removed from, and/or rearranged in the flow 900.

At stage 910, positioning of the target UE 700 is triggered. The positioning may be general positioning or on-demand positioning. For example, an on-demand positioning trigger message 912 may be sent by the network entity 800 (e.g., an LMF), e.g., in response to a request for the position of the target UE 700 (e.g., for a position-dependent application). The on-demand positioning trigger message 912 may be sent using LPP signaling from the LMF and/or a DCI (downlink control information) message and/or in a MAC-CE (Medium Access Control-Control Element) message from the serving cell. As another example, at sub-stage 914, an on-demand positioning trigger may occur internally to the target UE 700. As another example, a periodic positioning trigger (e.g., expiration of a timer) may occur at sub-stage 914.

At stage 920, the target UE 700 may transfer one or more reference signals with one or more of the anchor(s) 905, and/or obtain and possibly share one or more locations of the anchor(s) 905, and/or provide location information regarding the target UE 700. Anchors that may be selected for use in positioning of the target UE 700 (e.g., that are within range for transferring signals wirelessly with the target UE 700) may be called candidate anchors. In use for positioning of the target UE 700, anchors may transfer one or more reference signals and/or location information with the target UE 700. The transfer of reference signal(s), location(s), and/or location information may be used, as discussed further below, to select one or more of the anchor(s) 905 for use in determining position information for the target UE 700.

The target UE 700, e.g., the anchor unit 750, may send one or more reference signals 921 to one or more of the anchor(s) 905 that the anchor(s) 905 may measure and report. For example, the target UE 700 may be configured to send, based on absence of an established sidelink connection with one or more UEs of the anchor(s) 905, one or more reference signals (e.g., UL-PRS, SL-PRS) in a sidelink resource pool. Sidelink PRS may be configured by the network entity 800 based on an estimate of the location of the target UE 700 (e.g., a center of a serving cell of the target UE 700) and locations of the anchor(s) 905 such that SL-PRS are configured for the anchor(s) 905 meeting one or more criteria (e.g., minimum distance from the target UE 700). The target UE 700 may be configured to send the reference signal(s) 921 in response to a request received from the network entity 800 (e.g., a serving TRP 300 for the target UE 700 and/or the server 400 (e.g., an LMF)). The anchor(s) 905 that receive the reference signal(s) 921 may measure the reference signal(s) 921 and report one or more corresponding measurements 922, 923 to the target UE 700 and/or the network entity 800 (e.g., a serving TRP 300 for each respective one of the anchor(s) 905 and/or the server 400 (e.g., an LMF)), respectively. The anchor(s) 905 may be configured to report the measurement(s) 922, 923 if the measurement(s) 922, 923 meet one or more criteria, e.g., to help ensure that anchors used for positioning of the target UE 700 help center the target UE 700 in a GDOP pattern. The anchor(s) 905 may be configured to report the measurement(s) 922, 923 if the measurement(s) 922, 923 meet one or more thresholds indicative of the anchor(s) 905 being at least a threshold distance from the target UE 700. For example, the criteria may include that an RSRP of a reference signal is below an RSRP threshold and/or that a pathloss of a reference signal is above a pathloss threshold and/or that a SINR of a reference signal is below a SINR threshold and/or that an SNR of a reference signal is below an SNR threshold. The network entity 800 may be configured to select, based on the measurement(s) 923, one or more of the anchor(s) 905 to be the anchor(s) (e.g., DL anchor(s) and/or SL anchor(s)) used for positioning of the target UE 700, e.g., as discussed below with respect to stage 940 and elsewhere herein. The target UE 700, e.g., the anchor unit 750, may be configured to use the measurement(s) 922 to select (e.g., to help select) one or more of the anchor(s) 905 to use for positioning of the target UE 700 as discussed below with respect to stage 930 and elsewhere herein.

One or more of the anchor(s) 905 may send one or more reference signals 924 to the target UE 700 for measurement and possibly reporting, for use in determining anchors for positioning of the target UE 700. For example, for general (e.g., periodic) positioning, one or more of the anchor(s) 905, e.g., one or more TRPs 300 and/or one or more UEs, may send reference signals (e.g., DL-PRS and/or SL-PRS) to the target UE 700. The PRS may be configured and scheduled for general positioning or on-demand positioning. For on-demand positioning, the PRS may be preconfigured and triggered by the positioning trigger message 912. The preconfigured PRS can be updated, e.g., based on one or more requirements of the UE and/or the LMF. On-demand PRS may be used for one-time positioning or positioning enhancement. As another example of the reference signal(s) 924, the anchor(s) 905 may send an SSB (Synchronization System Block) message and/or a CSI-RS (Channel State Information-Reference Signal). The target UE 700 (e.g., the anchor unit 750) may be configured to measure the reference signal(s) 924, determine one or more corresponding measurements, e.g., RSRP, pathloss, SINR, SNR, and estimate a relative distance between the target UE 700 and a respective one of the anchor(s) 905. The target UE 700, e.g., the anchor unit 750, may be configured to use, e.g., measure, one or more other signals as reference signals to estimate a distance between the target UE 700 and a respective one of the anchor(s) 905. For example, the target UE 700 may use, as a reference signal, a PSCCH (Physical Sidelink Control Channel) signal, a PSSCH (Physical Sidelink Shared Channel) signal, a PSBCH (Physical Sidelink Broadcast Channel) signal, an SL-CSI-RS, and/or a PSFCH (Physical Sidelink Feedback Channel) signal. The target UE 700 may be configured to determine whether a respective one of the anchor(s) 905 is LOS with respect to the target UE 700. The target UE 700, e.g., the anchor unit 750, may be configured to use the measurement(s) of the reference signal(s) 924 to select (e.g., to help select) one or more of the anchor(s) 905 to use for positioning of the target UE 700 as discussed below with respect to stage 930 and elsewhere herein. The target UE 700 may be configured to send one or more of the measurement(s) in one or more measurement messages 925 to the network entity 800. The network entity 800 may be configured to select, based on the measurement(s) 923, one or more of the anchor(s) 905 to be the anchor(s) for positioning of the target UE 700, e.g., as discussed below with respect to stage 940 and elsewhere herein.

The target UE 700 may send one or more location information requests 926 to one or more of the anchor(s) 905. For example, with the target UE 700 and one or more of the anchor(s) 905 having respective sidelink(s) established, the target UE 700 may send the location information request(s) 926 to the respective anchor(s) 905 requesting location information indicative of the location(s) of the anchor(s) 905. The anchor(s) 905 may respond to the location information request(s) 926 by sending location information to the target UE 700 in one or more location information messages 927 and/or to the network entity 800 in one or more location information messages 928. The location information message(s) 927, 928 may explicitly indicate one or more locations of one or more of the anchor(s) 905, e.g., programmed into the anchor(s) 905, determined from cellular signals, determined from other signaling (e.g., SPS signaling), etc. The location information message(s) 927, 928 may explicitly indicate one or more differences in location (distances) between the target UE 700 and one or more of the anchor(s) 905. The target UE 700 may send location information from the anchor(s) 905 to the network entity 800 in one or more location information messages 929. The target UE 700 and/or the network entity 800 may be configured to select, based on the location information message(s) 927-929, respectively, one or more of the anchor(s) 905 to be the anchor(s) for positioning of the target UE 700, e.g., as discussed below with respect to stages 930, 940, respectively, and elsewhere herein.

At stage 930, the target UE 700 may select one or more of the anchor(s) 905 to be used as one or more anchors for positioning of the target UE 700 (i.e., for determining position information for the target UE 700). The target UE 700, e.g., the anchor unit 750 may be configured to use one or more of the measurement(s) 922, and/or one or more measurements of the reference signal(s) 924, and/or one or more locations indicated by the location information message(s) 927 to determine one or more of the anchor(s) 905 to use for positioning of the target UE 700.

The target UE 700 may be configured, dynamically or statically, to select the anchor(s) 905 based on one or more criteria. The target UE 700 may be statically configured, e.g., according to hard-coding of the processor 710 and/or the memory 730, e.g., during manufacture. The target UE 700 may be dynamically configured in accordance with one or more messages received by the target UE 700, e.g., from the network entity 800. The dynamic configuration may be to use one of a set of optional configurations that are statically configured in the target UE 700. The one or more criteria may include, for example, being furthest of the anchor(s) 905 from the target UE 700, being a minimum distance from the target UE 700, being within a range of distances of the target UE 700, being disposed such that the anchors are distributed about a center of a GDOP pattern of anchors, etc.

The target UE 700 may be configured to select the anchor(s) 905 that is(are) furthest from the target UE 700, e.g., the anchor(s) 905 with the longest reference signal travel time (e.g., the latest ToA with synchronized ToD of reference signals from the anchor(s) 905), the lowest RSRP, the highest pathloss, the lowest SINR, and/or the lowest SNR. The target UE 700 may be configured to select N of the anchor(s) 905 where N is an integer greater than one. For example, the target UE 700 may be configured to select the N furthest of the anchor(s) 905, or fewer of the anchor(s) 905 if there are fewer than N candidate anchors (e.g., fewer than N of the anchor(s) 905 within communication range of the target UE 700). As another example, the value of N may be selected such that sufficient anchors will be used to determine a position estimate for the target UE 700, or to determine a position estimate for the target UE 700 with at least a desired accuracy level. The selected anchor(s) 905 may supplement or enhance a position estimate using previously-selected anchor(s).

Also or alternatively, the target UE 700 may be configured to select the anchor(s) 905, if any, that is(are) at least a threshold distance away from the target UE 700. For example, the anchor unit 750 may be configured to select any of the anchor(s) that are further than a distance 650 from the target UE 610 shown in FIG. 6. As distance may be derived from one or more of various measurements, the anchor unit 750 may select each of the anchor(s) 905 that, for example, has a ToA later than a ToA threshold, an RSRP below an RSRP threshold, a pathloss above a pathloss threshold, a SINR below a SINR threshold, or an SNR below an SNR threshold. The anchor unit 750 may be configured to use a combination of two or more of these parameters to select an anchor of the anchor(s) 905. For example, to be selected, the anchor(s) 905 may need to have a corresponding ToA of a reference signal beyond the ToA threshold time and a SINR below the SINR threshold. If a minimum distance is required, then if the furthest of the anchor(s) 905 does not meet the minimum distance requirement, then none of the anchor(s) 905 will be selected for use in positioning for the target UE 700 at that time, although a later evaluation may result in one or more of the anchor(s) 905 being selected for use.

Also or alternatively, the target UE 700 may be configured to select the anchor(s) 905, if any, that is(are) at least a first threshold distance away from the target UE 700 and no more than a second threshold distance away from the target UE 700. For example, the anchor unit 750 may be configured to select any of the anchor(s) that are further than the distance 650, and less than a distance 660, from the target UE 610 shown in FIG. 6. Thus, in the example shown in FIG. 6, the anchors 625, 626, 627, 628 are all within a distance range defined by the distances 650, 660 and are thus candidate anchors that may be selected for use in positioning for the target UE 610. Limiting the selected anchor(s) 905 to a range of distances from the target UE 700 may help ensure that the target UE 700 is near a center of a GDOP pattern of the anchor(s) 905 used for positioning the target UE 700. For example, an anchor 629 is beyond a distance 670 from the target UE 700, where the distance 670 is longer than the maximum threshold distance 660 (in this example). The anchor 629, while possibly being a candidate anchor, may be excluded from being selected for use in positioning the target UE 700 due to being disposed further than the distance 670 from the target UE 610. This may help prevent skewing of the center of the GDOP pattern due to an outlier anchor (e.g., an anchor that moves the GDOP pattern center, possibly undesirably away from the target UE 700, due to the distance from the target UE 700).

Also or alternatively, the target UE 700 may be configured to select the anchor(s) 905, if any, that is(are) LOS to the target UE 700. For example, the anchor unit 750 may require the anchor(s) 905 to be LOS with the target UE 700 in order to be selected. Thus, for example, the anchor unit 750 may not select a candidate anchor (e.g., the anchor 625) even though the candidate anchor is within a desired distance range between the distances 650, 660 from the target UE 700 because the anchor 625 is NLOS with the target UE 700 due to a building 642 disposed between the target UE 700 and the anchor 625. Being LOS, however, may be optional for being selected as an anchor for use in positioning for the target UE 700.

Also or alternatively, the target UE 700 may be configured to select the anchor(s) 905 that will provide or help provide the best GDOP. The anchor unit 750 may be configured to determine a GDOP estimate of a set of anchors and evaluate the GDOP estimate providable by different sets of anchors and select the anchor(s) 905 that provide the set of anchors with the best GDOP estimate. The selected anchor(s) 905 may be selected to complement anchor(s) 905 previously used, or may be selected independently of previously-selected/used anchors. The selected anchor(s) 905 may be selected to provide spatial diversity to improve the GDOP even though the selected anchor(s) 905 may not be as far away as one or more other anchor(s) 905. With spatial diversity, also called geometric diversity, the selected anchors 905 are distributed around the target UE 700 to avoid anchors being clustered together and biasing a position estimate of the target UE 700. For example, the anchor 624 may be selected in addition to the anchors 626 and 628 because use of the anchor 624 provides an anchor in a direction significantly different than for the anchors 626, 628, which may move the GDOP center toward the target UE 610. The anchor unit 750 may be configured to select, or be biased to select, one or more anchor(s) 905 such that there is at least one anchor in each 120° sector about the target UE 700 (e.g., sectors 671, 672, 673 shown in FIG. 6). To select the anchor(s) 905 based on effect on GDOP, an estimate of the location of the target UE 700 may be used, e.g., to determine the location of the target UE 700 relative to centers of GDOP patterns for various anchor combinations.

Also or alternatively, the target UE 700 may be configured to select the anchor(s) 905 based on the location(s) of the anchor(s) 905. For example, the anchor unit 750 may use the location(s) of the anchor(s) 905 to determine distance(s) to the target UE 700, spatial distribution of anchors, expected GDOP, etc.

Also or alternatively, the target UE 700 may be configured to select the anchor(s) 905 based on the location of the target UE 700. The anchor unit 750 may select the anchor(s) 905 based on a previous location estimate of the target UE 700 and/or a predicted (future) location of the target UE 700 and/or previous and/or predicted location(s) of the anchor(s) 905. The predicted locations may be based, for example, on the previous locations and one or more indications of motion, e.g., one or more sensor measurements for dead reckoning positioning, historical positions over time, SPS velocity indications, etc. The anchor unit 750 may use the previous and/or predicted location of the target UE 700 to select the anchor(s) 905, e.g., based on distance to the target UE 700.

Also or alternatively, the target UE 700 may be configured to select a set of the anchor(s) 905 that best meet the one or more criteria. For example, the target UE 700 may be configured to select the N furthest candidate anchors, or to select the M (or fewer) candidate anchors that provide the best GDOP using no more than M candidate anchors, or to select the set of candidate anchors with the best GDOP with each candidate anchor at least a threshold distance away from the target UE 700 (e.g., based on one or more measurement values relative one or more respective thresholds).

The target UE 700 may send PRS configuration request messages, as appropriate, to the anchor(s) 905 and/or to the network entity 800. The target UE 700 may send a PRS configuration request 932 to the network entity 800 using LPP signaling if the network entity 800 is the server 400. The target UE may send the PRS configuration request 932 to the network entity 800 using UCI (Uplink Control Information) signaling or a MAC-CE/RRC (Radio Resource Control) message if the network entity 800 is a TRP 300 (e.g., the serving TRP 300 for the target UE 700), and the TRP 300 may send a corresponding request message to the server 400 using NRPPa. The PRS configuration request 932 may request configuring (or reconfiguring as the case may be) of PRS for transfer between the target UE 700 and the selected anchor(s) 905 for use in positioning for the target UE 700.

At stage 940, the network entity 800 may select one or more of the anchor(s) 905 to be used as one or more anchors for positioning of the target UE 700 (i.e., for determining position information for the target UE 700). The network entity 800, e.g., the anchor unit 850 may be configured to use one or more of the measurement(s) 923, 925, and/or one or more locations indicated by the location information message(s) 928 to determine one or more of the anchor(s) 905 to use for positioning of the target UE 700. The network entity 800 may select the anchor(s) 905 using similar techniques as the target UE 700 as discussed above with respect to stage 930, e.g., using one or more similar criteria. If positioning of the target UE 700 is for positioning enhancement (improving a position estimate), then the network entity 800 may use a positioning estimate for the target UE 700 to select the anchor(s) 905, etc. (e.g., configure the PRS, e.g., on-demand PRS). The network entity 800 may also or alternatively select the anchor(s) 905 based on the PRS configuration request 932. For example, the anchor unit 850 may use the selected anchor(s) 905 indicated in the request 932, may select the anchor(s) 905 independent of the selected anchor(s) 905 indicated in the request 932, or may use the selected anchor(s) 905 indicated in the request 932 as part of a selection of the anchor(s) 905 by the anchor unit 850. For example, the anchor unit 850 may use the selected anchor(s) 905 indicated in the request 932 unless the selected anchor(s) 905 exceed an anchor limit imposed by the anchor unit 850, or if one or more of the indicated anchor(s) 905 do not meet one or more other criteria (e.g., minimum distance from the target UE 700, distance range of anchors from the target UE 700, etc.) imposed by the network entity 800.

At stage 950, the network entity 800 may send PRS configuration information to the target UE 700 and the anchor(s) 905 as appropriate. For example, the network entity 800 may send one or more PRS configuration messages 952 to the selected anchor(s) 905 to schedule PRS transfer for one or more UE anchors and/or to request PRS scheduling by one or more TRP anchors. The network entity 800 may send a PRS configuration message 954 to the target UE 700 to schedule PRS (e.g., DL-PRS, SL-PRS) for PRS transfer between the target UE 700 and the selected anchor(s) 905. The PRS configuration messages 952, 954 contain one or more parameters of an RS configuration, e.g., a DCI MAC-CE from a TRP or LPP from an LMF. The target UE 700 and the selected anchor(s) 905 (which become anchor(s) when used) use the RS configuration information to send and/or help measure one or more reference signals, e.g., by tuning one or more antennas appropriately.

Also at stage 950, the network entity 800 may send measurement reporting configuration information to the target UE 700. The network entity 800 may send a measurement reporting configuration message 956 to the target UE 700 to indicate from which of the anchor(s) 905 to report reference signal measurements, and/or one or more criteria to use to determine which reference signal measurements to report. For example, the message 956 may indicate for the target UE 700 to report measurements from each of the furthest anchor(s) from which the target UE 700 receives a reference signal. The message 956 may indicate to report the measurements in order of distance from the target UE 700 (e.g., descending order of distance (e.g., ascending order of ToA or pathloss or descending order of RSRP, SINR, or SNR)). The message 956 may indicate a maximum quantity of measurements to report and/or a maximum quantity of anchors from which to report measurements. The message 956 may indicate whether the target UE 700 is to report only measurements from anchors that are LOS with the target UE 700. The message 956 may be part of the PRS configuration message 954. The message 952 may indicate one or more thresholds to be met by a reference signal in order to be reported by the target UE 700. The threshold(s) may include a minimum distance from the target UE 700 and may include a maximum distance from the target UE 700. The threshold(s) may be expressed in terms of measurement value thresholds such as one or more ToA thresholds, one or more RSRP thresholds, one or more pathloss thresholds, one or more SINR thresholds, and/or one or more SNR thresholds. The message 952 may also or alternatively specify one or more anchors (e.g., by specifying one or more PRS IDs) from which to report reference signal measurements. The specified anchor(s) may be based, for example, on a previous and/or predicted location of the target UE 700 and/or previous and/or predicted locations of the anchors. Any of the indications of the message 956 may be coded, e.g., with one or more bit values mapping to preconfigured requests. For example, a single bit may be used to request reporting of PRS measurements from the furthest anchor(s) 905.

At stage 960, the selected anchor(s) 905 act as one or more anchors by sending one or more PRS 962 to the target UE 700 and/or receiving one or more PRS 964 from the target UE 700. The selected anchor(s) send PRS 962 based on the PRS configuration message 952, e.g., with the indicated parameter(s). The target UE 700 sends PRS 964 based on the PRS configuration message 954, e.g., with the indicated parameter(s). The anchor(s) 905 may send one or more appropriate measurement reports 966 to the network entity 800. The report(s) 966 may include one or more measurements of the PRS 964 useful in determining location of the target UE 700.

At stage 970, the target UE 700 determines position information based on received PRS. For example, the target UE 700 may measure the PRS 962 to determine measurement information (e.g., RSRP, ToA, SINR, a position estimate, etc.). The target UE 700 may send some or all of the determined position information to the network entity 800 in a position information message 972. For example, the target UE 700 may send the position information that meet the one or more criteria specified in the measurement reporting configuration message 956 (e.g., from one or more specified anchors and/or for signals meeting one or more measurement criteria).

At stage 980, the network entity 800 may determine position information. The network entity 800 (e.g., an LMF) may, for example, determine a range and/or a position estimate of the target UE 700 based on the position information message 972, and possibly based on one or more other messages, e.g., the measurement report(s) 966 with other measurement information.

Operation

Figure 10:
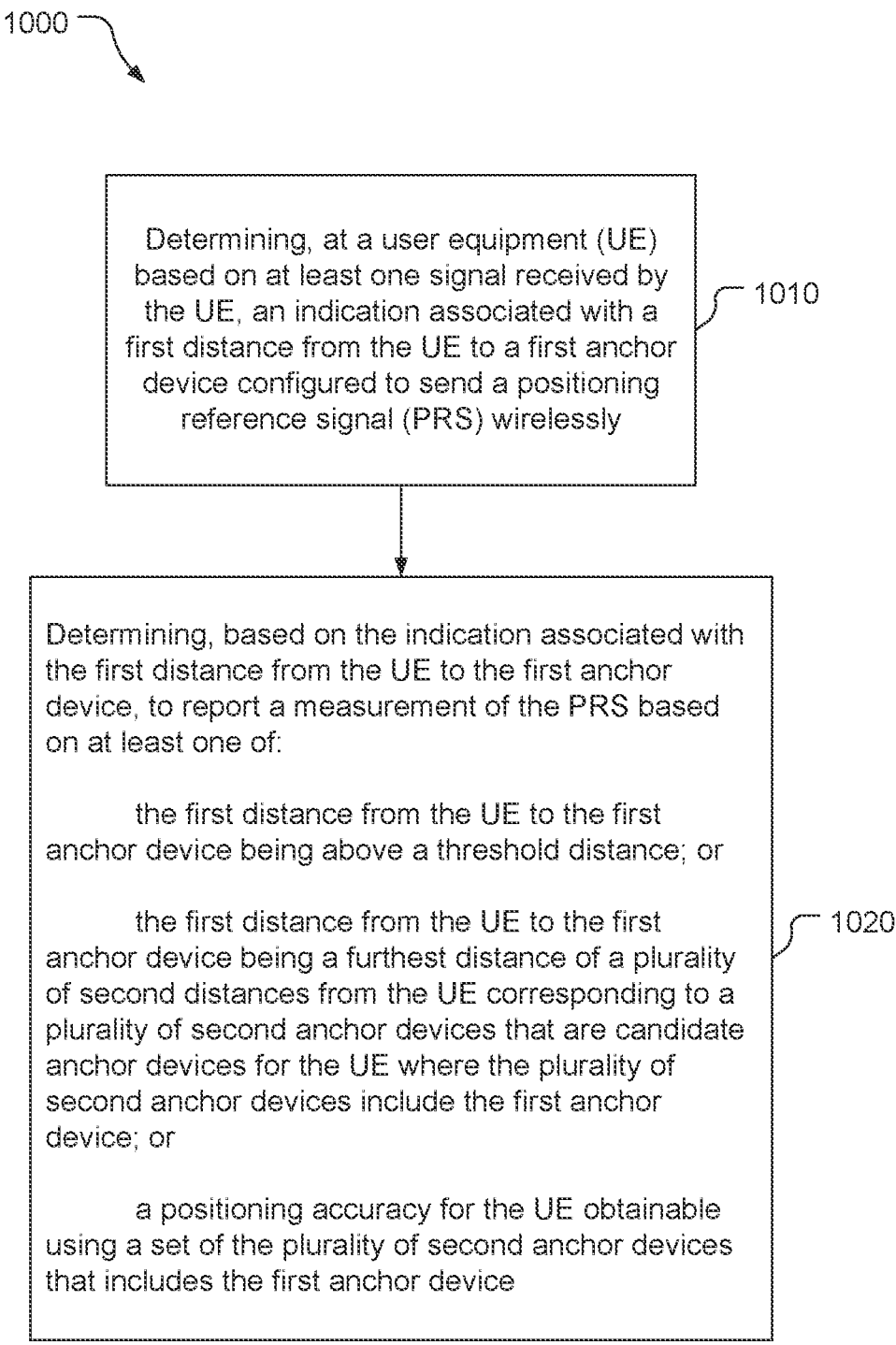
FIG. 10 is a block flow diagram of a positioning reference signal measurement reporting method.

Referring to FIG. 10, with further reference to FIGS. 1-9, a PRS measurement reporting method 1000 includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 includes determining, at a user equipment (UE) based on at least one signal received by the UE, an indication associated with a first distance from the UE to a first anchor device configured to send a positioning reference signal (PRS) wirelessly. For example, the target UE 700 may calculate a distance between the target UE 700 and a respective one of the anchor(s) 905, e.g., based on one or more of the measurement(s) 922 and/or by measuring one or more of the reference signal(s) 924. As another example, the target UE 700 may determine the distance between the target UE 700 and an anchor of the anchor(s) 905 based on the location information message(s) 927 (e.g., a location of the anchor of the anchor(s) 905 or a distance indicated in the location information message(s) 927). The processor 710, possibly in combination with the memory 730, in combination with the interface 720 (e.g., the wireless receiver 244 and the antenna 246 and possibly the wireless transmitter 242) may comprise means for determining an indication associated with a first distance from the UE to a first anchor device.

At stage 1020, the method 1000 includes determining, based on the indication associated with the first distance from the UE to the first anchor device, to report a measurement of the PRS based on at least one of: the first distance from the UE to the first anchor device being above a threshold distance; or the first distance from the UE to the first anchor device being a furthest distance of a plurality of second distances from the UE corresponding to a plurality of second anchor devices that include the first anchor device; or a positioning accuracy for the UE obtainable using a set of the plurality of second anchor devices that includes the first anchor device. The target UE 700 may, for example, be configured to determine to report the PRS measurement only if the distance between the target UE 700 and the anchor 905 is more than a threshold distance, e.g., the distance 650. As another example, the target UE 700 may determine to report a measurement from the anchor that is furthest from the target UE 700 (or the N furthest of the anchor(s) 905, and/or to report measurements in order of distance of the anchor(s) 905 from the target UE 700). As another example, the target UE 700 may determine to report PRS measurement(s) based on the positioning accuracy (e.g., GDOP) that the PRS measurement(s) may provide. As another example, the LOS status of an anchor may be used to determine whether to report a measurement, e.g., only reporting measurements of signals from LOS anchors. The target UE 700 may be statically configured or dynamically configured (e.g., based on a message received from a network entity) to determine to report PRS measurement based on one or more criteria such as those discussed herein. Determining to report PRS measurement based on one or more of the criteria may improve positioning accuracy, e.g., by helping to center the target UE in a GDOP pattern. The processor 710, possibly in combination with the memory 730, possibly in combination with the interface 720 (e.g., the wireless receiver 244 and the antenna 246) may comprise means for determining to report a measurement of PRS.

Implementations of the method 1000 may include one or more of the following features. In an example implementation, determining to report the measurement of the PRS is based on the first distance to the first anchor device and based on the plurality of second distances from the UE to the plurality of second anchor devices. For example, the anchor unit 750 may determine to report PRS measurements based on distances to multiple respective anchors, e.g., reporting PRS measurements of the furthest N anchors, reporting measurements in reverse order of distance from the target UE 700 (i.e., in descending order of respective anchor distance from the target UE 700), etc. In another example implementation, the PRS is a first PRS, the measurement is a first measurement, the threshold distance is a first threshold distance, the set of the plurality of second anchor devices is a first set of the plurality of second anchor devices, and the method comprises: selecting a second set of the plurality of second anchor devices based on each of the plurality of second distances to the plurality of second anchor devices of the second set of the plurality of second anchor devices being above the first threshold distance and below a second threshold distance; and reporting second measurements of second PRS corresponding to the plurality of second anchor devices for only the second set of the plurality of second anchor devices. For example, the anchor unit 750 may select the anchor(s) 905 within a distance range from the target UE 700, e.g., from the distance 650 to the distance 660 from the target UE 610, and report PRS measurements only for PRS from such anchors. The processor 710, possibly in combination with the memory 730, may comprise means for selecting the second set of the plurality of second anchor devices and the processor 710, possibly in combination with the memory 730, in combination with the interface 720 (e.g., the wireless transmitter 242 and the antenna 246) may comprise means for reporting the second measurements of second PRS.

Also or alternatively, implementations of the method 1000 may include one or more of the following features. In an example implementation, the threshold distance is a first threshold distance, and determining to report the measurement of the PRS is based on the indication of the first distance from the UE to the first anchor device being above the first threshold distance and below a second threshold distance. In another example implementation, determining to report the measurement of the PRS is based on the first anchor device being disposed line of sight (LOS) relative to the UE. For example, the anchor unit 750 may exclude any of the anchor(s) 905 that is(are) NLOS with the target UE 700 from being used as an anchor for positioning for the target UE 700. In another example implementation, the indication associated with the first distance from the UE to the first anchor device comprises at least one of: a PRS measurement value, a location of the first anchor device, or an explicit indication of the first distance from the UE to the first anchor device. For example, the anchor unit 750 may determine a PRS measurement (e.g., RSRP, ToA, pathloss, SINR, SNR) as an indication of distance between the target UE 700 and an anchor of the anchor(s) 905, or may determine a location of an anchor of the anchor(s) 905 (e.g., from the location information message(s) 927), or may determine the actual distance (e.g., based on the location information message(s) 927, from an explicit indication of distance in the location information, and/or based on the measurement(s) 922). In another example implementation, determining to report the measurement of the PRS is based on the positioning accuracy for the UE obtainable using the set of the plurality of second anchor devices that includes the first anchor device, and the positioning accuracy is a geometric dilution of precision (GDOP) estimate. For example, the anchor unit 750 may determine to report a PRS measurement only for an anchor of the anchor(s) 905 that improves a GDOP estimate and/or that provides or helps provide (in combination with other PRS measurement(s)) an acceptable GDOP estimate. In another example implementation, determining to report the measurement of the PRS is based on the GDOP estimate being the best GDOP estimate of multiple GDOP estimates corresponding to multiple sets of the second anchor devices. For example, the anchor unit 750 may evaluate the GDOP estimate for each of multiple possible sets of the anchor(s) 905 and select, for (measurement and) reporting, the set of the anchor(s) 905 that has the best (predicted) GDOP.

Also or alternatively, implementations of the method 1000 may include one or more of the following features. In an example implementation, determining to report the measurement of the PRS is based on the first distance being above the threshold distance, the method comprising determining that the first distance is above the threshold distance based on the PRS having, at the UE, at least one of: a ToA above a ToA threshold; an RSRP below an RSRP threshold;

a pathloss above a pathloss threshold; a SINR below a SINR threshold; or an SNR below an SNR threshold. The anchor unit 750 may implicitly determine the distance between the target UE 700 and each anchor 905 by evaluating one or more PRS measurements and may report PRS from an anchor of the anchor(s) 905 only if the PRS measurement(s) are above or below respective thresholds implicitly indicative of the anchor 905 being farther than a threshold distance from the target UE 700. In another example implementation, the method 1000 includes determining at least one of the plurality of second distances based on at least one measurement of at least one reference signal other than PRS. For example, the anchor unit 750 may measure RSRP, pathloss, SINR, and/or SNR of non-PRS reference signals (DL or SL) such as SSB and/or CSI-RS in the reference signal(s) 924 to determine indications of distance to the anchor(s) 905. The processor 710, possibly in combination with the memory 730, in combination with the interface 720 (e.g., the wireless receiver 244 and the antenna 246) may comprise means for determining at least one of the plurality of second distances. In another example implementation, the method 1000 may include requesting a network entity to schedule the PRS. For example, the anchor unit 750 may send the PRS configuration request 932 to the network entity 800 to have PRS scheduled for the selected anchor(s) 905. The processor 710, possibly in combination with the memory 730, in combination with the interface 720 (e.g., the wireless transmitter 242 and the antenna 246) may comprise means for requesting the network entity to schedule the PRS. In an example implementation, the at least one signal is at least one of a downlink PRS received from a network entity or a sidelink PRS received from another UE. For example, the anchor unit 750 may measure DL PRS from TRP anchor(s) 905 and/or SL PRS from UE anchor(s) 905 to determine one or more indications of distance between the target UE 700 and the anchor(s) 905.

Figure 11:
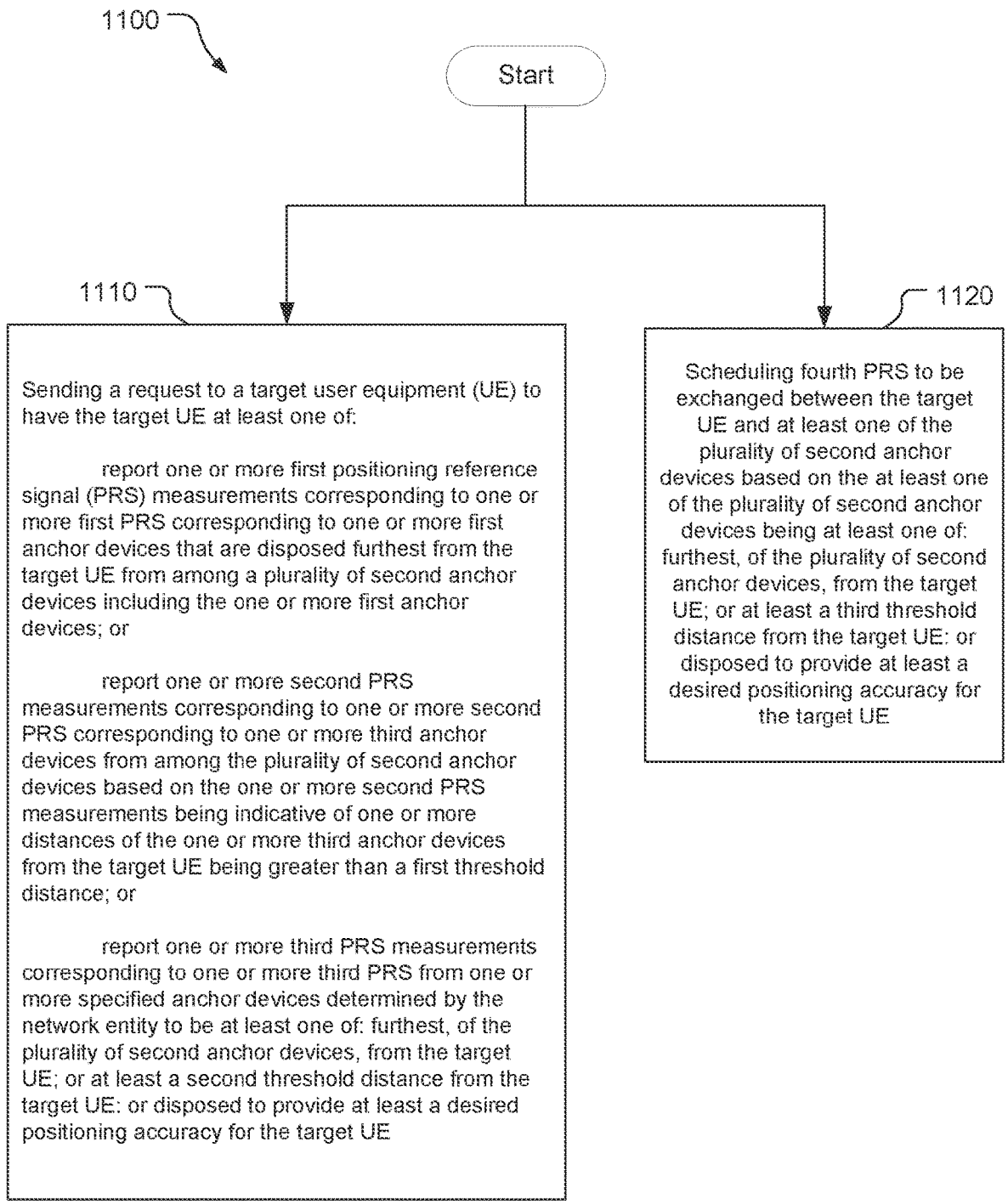
FIG. 11 is a block flow diagram of a method for facilitating obtaining position information for a target user equipment.

Referring to FIG. 11, with further reference to FIGS. 1-9, a method 1100 for facilitating obtaining position information for a target UE includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes sending a request to a target user equipment (UE) to have the target UE at least one of: report one or more first positioning reference signal (PRS) measurements corresponding to one or more first PRS corresponding to one or more first anchor devices that are disposed furthest from the target UE from among a plurality of second anchor devices including the one or more first anchor devices; or report one or more second PRS measurements corresponding to one or more second PRS corresponding to one or more third anchor devices from among the plurality of second anchor devices based on the one or more second PRS measurements being indicative of one or more distances of the one or more third anchor devices from the target UE being greater than a first threshold distance; or report one or more third PRS measurements corresponding to one or more third PRS from one or more specified anchor devices determined by the network entity to be at least one of: furthest, of the plurality of second anchor devices, from the target UE; or at least a second threshold distance from the target UE; or disposed to provide at least a desired positioning accuracy for the target UE. For example, the anchor unit 850 may send the measurement reporting configuration message 956 to the target UE 700 requesting the target UE 700 to report one or more PRS measurements corresponding to the furthest anchor(s) 905 from the target UE 700 and/or corresponding to the anchor(s) 905 that are at least a threshold distance from the target UE 700. The message 956 may specifically (explicitly or implicitly) indicate one or more of the anchor(s) 905 from which to report PRS measurement(s). The PRS configuration message 954 may implicitly specify the anchor(s) 905 from which PRS measurement(s) is(are) to be reported by configuring PRS only for one or more of the anchor(s) 905. The processor 810, possibly in combination with the memory 830, in combination with the interface 820 (e.g., the wireless transmitter 342 and the antenna 346 or the wireless transmitter 442 and the antenna 446) may comprise means for sending the request.

Also or alternatively, at stage 1120 the method 1100 includes scheduling fourth PRS to be transferred between the target UE and at least one of the plurality of second anchor devices based on the at least one of the plurality of second anchor devices being at least one of: furthest, of the plurality of second anchor devices, from the target UE; or at least a third threshold distance from the target UE; or disposed to provide at least a desired positioning accuracy for the target UE. For example, the anchor unit 850 may schedule PRS for one or more of the anchor(s) 905 to attempt to ensure that the anchor(s) used for positioning of the target UE 700 are far from the target UE 700. The anchor unit 850 may send the PRS configuration messages 952, 954 to schedule the PRS. The processor 810, possibly in combination with the memory 830, in combination with the interface 820 (e.g., the wireless transmitter 342 and the antenna 346 or the wireless transmitter 442 and the antenna 446) may comprise means for scheduling the fourth PRS.

Implementations of the method 1100 may include one or more of the following features. In an example implementation, the method 1100 includes sending the request to the target UE to have the target UE report the one or more first PRS measurements in descending order of distance of the one or more first anchor devices from the target UE. For example, the request may be for the target UE to report the one or more first PRS measurements in ascending order of RSRP of the one or more first PRS, ascending order of SINR of the one or more first PRS, ascending order of SNR of the one or more first PRS, or descending order of ToA of the one or more first PRS, or descending order of pathloss of the one or more first PRS. In another example implementation, the method 1100 includes sending the request to the target UE to have the target UE report the one or more second PRS measurements based on the one or more second PRS having, at the target UE: a ToA above a ToA threshold; an RSRP below an RSRP threshold; a pathloss above a pathloss threshold; a SINR below a SINR threshold; and/or an SNR below an SNR threshold. In another example implementation, the method 1100 includes scheduling the fourth PRS to be transferred between the target UE and at least one of the plurality of second anchor devices based on one or more fourth PRS measurements of one or more fifth PRS transferred with the target UE. For example, the anchor unit 850 may use measurement(s) of DL-PRS and/or SL-PRS transferred between the target UE 700 and one or more of the anchor(s) 905 (e.g., one or more TRP anchors and/or one or more UE anchors, respectively) to select one or more of the anchor(s) 905 to use for positioning of the target UE 700, and scheduling PRS transfer between the target UE 700 and the selected anchor(s) 905. In another example implementation, the method 1100 includes scheduling the fourth PRS to be transferred between the target UE and at least one of the plurality of second anchor devices based on at least one of a previous position estimate for the target UE or a predicted position estimate for the target UE. For example, the anchor unit 850 may use past and/or expected future location of the target UE 700 to select the anchor(s) 905 to use for positioning the target UE 700.

Figure 12:
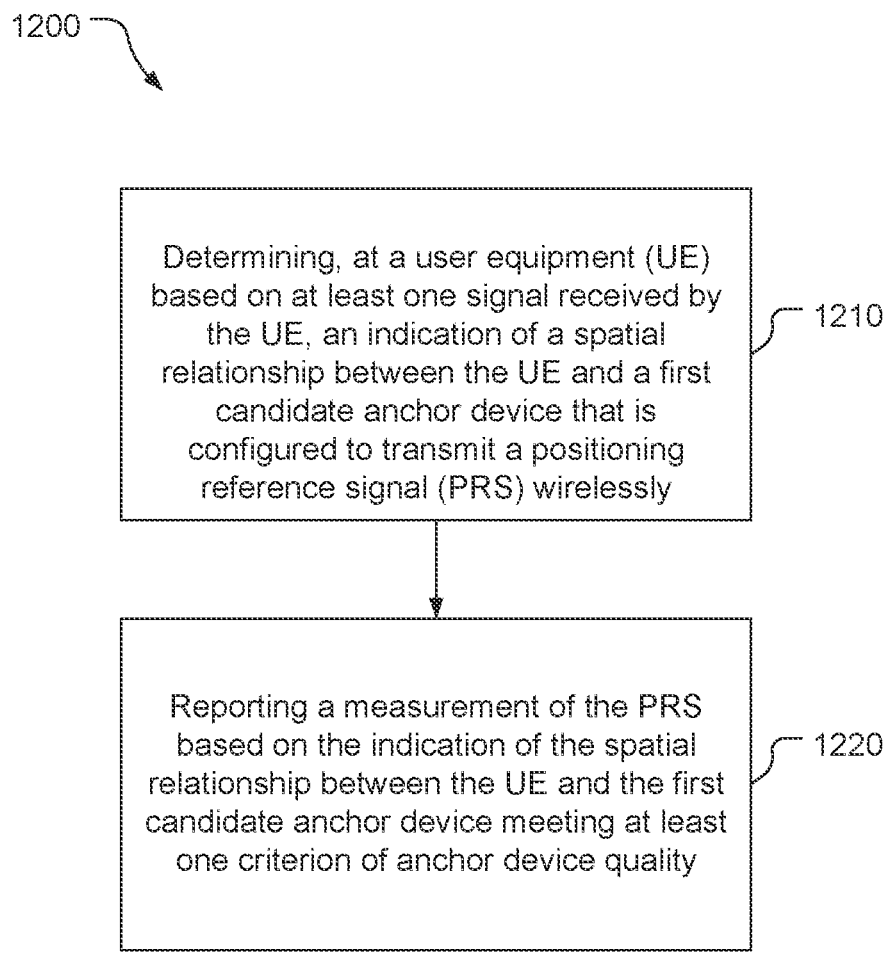
FIG. 12 is a block flow diagram of a positioning reference signal reporting method.

Referring to FIG. 12, with further reference to FIGS. 1-10, a PRS measurement reporting method 1200 includes the stages shown. The method 1200 is, however, an example only and not limiting. The method 1200 may be altered, e.g., by having stages added, removed, rearranged, combined, performed concurrently, and/or having single stages split into multiple stages.

At stage 1210, the method 1200 includes determining, at a user equipment (UE) based on at least one signal received by the UE, an indication of a spatial relationship between the UE and a first candidate anchor device that is configured to transmit a positioning reference signal (PRS) wirelessly. For example, the target UE 700 may calculate a relationship (e.g., a distance) between the target UE 700 and a respective one of the anchor(s) 905, e.g., based on one or more of the measurement(s) 922 and/or by measuring one or more of the reference signal(s) 924. As another example, the target UE 700 may determine the relationship between the target UE 700 and an anchor of the anchor(s) 905 based on the location information message(s) 927 (e.g., a location of the anchor of the anchor(s) 905). The candidate anchor device may be configured to receive PRS wirelessly as well as transmit PRS wirelessly. The processor 710, possibly in combination with the memory 730, in combination with the interface 720 (e.g., the wireless receiver 244 and the antenna 246 and possibly the wireless transmitter 242) may comprise means for determining an indication of a spatial relationship between the UE and a first candidate anchor device.

At stage 1220, the method 1200 includes reporting a measurement of the PRS based on the indication of the spatial relationship between the UE and the first candidate anchor device meeting at least one criterion of anchor device quality. For example, the anchor unit 750 may report a PRS measurement (or multiple PRS measurements) based on the first candidate anchor device likely being a good anchor, e.g., useful in determining location of the target UE 700. The processor 710, possibly in combination with the memory 730, in combination with the interface 720 (e.g., the wireless transmitter 242 and the antenna 246 and possibly the wireless transmitter 242) may comprise means for reporting the measurement of the PRS.

Implementations of the method 1200 may include one or more of the following features. In an example implementation, the at least one criterion of anchor device quality comprises at least one of: a first distance from the UE to the first candidate anchor device being above a threshold distance; or the first distance from the UE to the first candidate anchor device being a furthest distance of a plurality of second distances from the UE to a plurality of second anchor devices that include the first candidate anchor device; or a positioning accuracy for the UE that is obtainable using a set of the plurality of second anchor devices that includes the first candidate anchor device. In another example implementation, the at least one criterion of anchor device quality comprises geometric diversity of the first candidate anchor device relative to at least one other anchor device. For example, a direction to the first candidate anchor device relative to the target UE 700 may be assessed relative to one or more directions to one or more other (candidate) anchor devices to report PRS measurement (e.g., if the first candidate anchor device is geometrically diverse relative to the other anchor device(s) and not report the PRS measurement otherwise). In another example implementation, the at least one criterion of anchor device quality comprises a first distance from the UE to the first candidate anchor device and reporting the measurement of the PRS is further based on a plurality of second distances from the UE to a plurality of second anchor devices. For example, the anchor unit 750 may report PRS measurements based on distances to multiple respective anchors, e.g., reporting PRS measurements of the furthest N anchors, reporting measurements in reverse order of distance from the target UE 700 (i.e., in descending order of respective anchor distance from the target UE 700), etc. In a further example implementation, the PRS is a first PRS, the measurement is a first measurement, and the positioning reference signal measurement reporting method comprises reporting second measurements of second PRS corresponding to the plurality of second anchor devices based on each of the plurality of second distances from the UE to the plurality of second anchor devices being above a first threshold distance and below a second threshold distance. For example, the anchor unit 750 may select the anchor(s) 905 within a distance range from the target UE 700, e.g., from the distance 650 to the distance 660 from the target UE 610, and report PRS measurements for PRS from such anchors. In another further example implementation, the method 1200 includes determining at least one of the plurality of second distances based on at least one measurement of at least one reference signal other than PRS. For example, the anchor unit 750 may measure RSRP, pathloss, SINR, and/or SNR of non-PRS reference signals (DL or SL) such as SSB and/or CSI-RS in the reference signal(s) 924 to determine indications of distance to the anchor(s) 905. The processor 710, possibly in combination with the memory 730, in combination with the interface 720 (e.g., the wireless receiver 244 and the antenna 246) may comprise means for determining at least one of the plurality of second distances.

Also or alternatively, implementations of the method 1200 may include one or more of the following features. In an example implementation, the at least one criterion of anchor device quality comprises a first distance from the UE to the first candidate anchor device being above a first threshold distance and below a second threshold distance. In another example implementation, the at least one criterion of anchor device quality comprises the first candidate anchor device being disposed line of sight relative to the UE. For example, the anchor unit 750 may exclude measurements from any of the anchor(s) 905 that is(are) NLOS with the target UE 700 from being used for positioning for the target UE 700. In another example implementation, the indication of the spatial relationship between the UE and the first candidate anchor device comprises at least one of: a PRS measurement value, a location of the first candidate anchor device, or an explicit indication of a first distance from the UE to the first candidate anchor device. For example, the anchor unit 750 may determine a PRS measurement (e.g., RSRP, ToA, pathloss, SINR, SNR) as an indication of distance between the target UE 700 and an anchor of the anchor(s) 905, or may determine a location of an anchor of the anchor(s) 905 (e.g., from the location information message(s) 927), or may determine the actual distance (e.g., based on the location information message(s) 927, from an explicit indication of distance in the location information, and/or based on the measurement(s) 922).

Also or alternatively, implementations of the method 1200 may include one or more of the following features. In an example implementation, the at least one criterion of anchor device quality comprises a GDOP estimate for the UE that is obtainable using a plurality of second candidate anchor devices that includes the first candidate anchor device. For example, the anchor unit 750 may report a PRS measurement for an anchor of the anchor(s) 905 based on that PRS measurement improving a GDOP estimate and/or providing or help to provide (in combination with other PRS measurement(s)) an acceptable GDOP estimate. In a further example implementation, reporting the measurement of the PRS comprises reporting the measurement of the PRS based on the GDOP estimate being a minimum GDOP estimate of a plurality of GDOP estimates corresponding to a plurality of combinations of anchor devices.

Also or alternatively, implementations of the method 1200 may include one or more of the following features. In an example implementation, the at least one criterion of anchor device quality comprises a first distance from the UE to the first candidate anchor device being above a threshold distance, and the positioning reference signal measurement reporting method further comprises determining that the first distance is above the threshold distance based on the PRS having, at the UE, at least one of: a ToA above a ToA threshold; or a pathloss above a pathloss threshold; or an RSRP below an RSRP threshold; or a SINR below a SINR threshold; or an SNR below an SNR threshold. For example, the anchor unit 750 may implicitly determine the distance between the target UE 700 and each anchor 905 by evaluating one or more PRS measurements and may report a PRS measurement from an anchor of the anchor(s) 905 based on the PRS measurement being above or below a respective threshold being implicitly indicative of the anchor 905 being farther than a threshold distance from the target UE 700. The processor 710, possibly in combination with the memory 730 and/or the interface 720 (e.g., the wireless receiver 244 and the antenna 246), may comprise means for determining that the first distance is above the threshold distance. In another example implementation, the method 1200 includes requesting a network entity to schedule the PRS. For example, the anchor unit 750 may send the PRS configuration request 932 to the network entity 800 to have PRS scheduled for the selected anchor(s) 905. The processor 710, possibly in combination with the memory 730, in combination with the interface 720 (e.g., the wireless transmitter 242 and the antenna 246) may comprise means for requesting the network entity to schedule the PRS. In an example implementation, the at least one signal is at least one of a downlink PRS received from a network entity or a sidelink PRS received from another UE. For example, the anchor unit 750 may measure DL PRS from TRP anchor(s) 905 and/or SL PRS from UE anchor(s) 905 to determine one or more indications of spatial relationship (e.g., distance) between the target UE 700 and the anchor(s) 905.

Referring to FIG. 13, with further reference to FIGS. 1-9 and 11, a method 1300 for use in positioning a user equipment includes the stage shown. The method 1300 is, however, an example only and not limiting. The method 1300 may be altered, e.g., by having stages added and/or having a single stage split into multiple stages. The method 1300 may be used to determine information from which a position of a user equipment may be determined.

At stage 1310, the method 1300 includes transmitting, from a network entity, a positioning reference signal message to a target user equipment based on one or more spatial relationships between the target user equipment and one or more first anchor devices meeting one or more criteria of anchor device quality, the positioning reference signal message comprising a request for the target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof. For example, the anchor unit 850 may, based on usefulness of one or more of the anchor(s) as anchor(s), transmit the measurement reporting configuration message 956 to the target UE 700 requesting the target UE 700 to report one or more PRS measurements. As another example, the anchor unit 850 may, based on usefulness of one or more of the anchor(s) as anchor(s), schedule PRS for one or more of the anchor(s) 905, e.g., to attempt to ensure that the anchor(s) used for positioning of the target UE 700 are far from the target UE 700. The anchor unit 850 may send the PRS configuration messages 952, 954 to schedule the PRS. The processor 810, possibly in combination with the memory 830, in combination with the interface 820 (e.g., the wireless transmitter 342 and the antenna 346 or the wireless transmitter 442 and the antenna 446) may comprise means for transmitting the PRS message. The method 1300 may further comprise determining the PRS message, and the processor 810, possibly in combination with the memory 830, possibly in combination with the interface 820 (e.g., the wireless receiver 344 and the antenna 346, or the wireless receiver 444 and the antenna 446, or the wired transmitter 452) may comprise means for determining the PRS message.

Implementations of the method 1300 may include one or more of the following features. In an example implementation, the one or more criteria of anchor device quality comprise: the one or more first anchor devices being disposed furthest from the target user equipment from among a plurality of second anchor devices including the one or more first anchor devices; or a distance between a respective one of the one or more first anchor devices and the target user equipment being greater than a threshold distance; or the one or more first anchor devices being disposed relative to the target user equipment to provide at least a desired positioning accuracy for the target user equipment. For example, the anchor unit 750 may determine quality of an anchor device (to serve as an anchor) based on the anchor device being at least a threshold distance from the target UE 700, being among the further candidate anchor devices from the target UE 700, or disposed relative to the target UE 700 such that a desired positioning accuracy may be achieved. In another example implementation, transmitting the positioning reference signal message comprises transmitting the positioning reference signal message to the target user equipment to request the target user equipment to report the one or more positioning reference signal measurements in descending order of distance of the one or more first anchor devices from the target user equipment. In a further example implementation, transmitting the positioning reference signal message comprises transmitting the positioning reference signal message to the target user equipment to request the target user equipment to report the one or more positioning reference signal measurements in one of ascending order of reference signal received power of the one or more positioning reference signals, ascending order of signal-to-interference-plus-noise ratio of the one or more positioning reference signals, ascending order of signal-to-noise ratio of the one or more positioning reference signals, or descending order of time of arrival of the one or more positioning reference signals, e.g., as implicit indications of distance from anchor device to target UE.

Also or alternatively, implementations of the method 1300 may include one or more of the following features. In an example implementation, transmitting the positioning reference signal message comprises transmitting the positioning reference signal message to the target user equipment to request the target user equipment to report the one or more positioning reference signal measurements based on the one or more positioning reference signals having, at the target user equipment, at least one of: a ToA above a ToA threshold; a pathloss above a pathloss threshold; an RSRP below an RSRP threshold; a SINR below a SINR threshold; and/or an SNR below an SNR threshold. In another example implementation, the one or more positioning reference signals are one or more first positioning reference signals, the one or more positioning reference signal measurements are one or more first positioning reference signal measurements, and wherein the method comprises scheduling positioning reference signal transfer between the target user equipment and the one or more first anchor devices based on one or more second positioning reference signal measurements of one or more second positioning reference signals transferred with the target user equipment. For example, the anchor unit 850 may use measurement(s) of DL-PRS and/or SL-PRS transferred between the target UE 700 and one or more of the anchor(s) 905 (e.g., one or more TRP anchors and/or one or more UE anchors, respectively) to select one or more of the anchor(s) 905 to use for positioning of the target UE 700, and may schedule PRS transfer between the target UE 700 and the selected anchor(s) 905. The method 1300 may further comprise determining the PRS message, and the processor 810, possibly in combination with the memory 830, possibly in combination with the interface 820 (e.g., the wireless receiver 344 and the antenna 346, or the wireless receiver 444 and the antenna 446, or the wired transmitter 452) may comprise means for scheduling the PRS transfer. In another example implementation, the method 1300 includes scheduling positioning reference signal transfer between the target user equipment and the one or more first anchor devices based on at least one of a previous position estimate for the target user equipment or a predicted position estimate for the target user equipment. For example, the anchor unit 850 may use past and/or expected future location of the target UE 700 to select the anchor(s) 905 to use for positioning the target UE 700. The method 1300 may further comprise determining the PRS message, and the processor 810, possibly in combination with the memory 830, possibly in combination with the interface 820 (e.g., the wireless receiver 344 and the antenna 346, or the wireless receiver 444 and the antenna 446, or the wired transmitter 452) may comprise means for scheduling the PRS transfer.

Implementation Examples

Implementation examples are provided in the following numbered clauses.

Clause 1. A user equipment (UE) comprising:
an interface;
a memory; and
a processor communicatively coupled to the interface and the memory and configured to:
determine, based on at least one signal received via the interface, an indication of a spatial relationship between the UE and a first candidate anchor device that is configured to transmit a positioning reference signal (PRS) wirelessly; and
report a measurement of the PRS based on the indication of the spatial relationship between the UE and the first candidate anchor device meeting at least one criterion of anchor device quality.

Clause 2. The UE of clause 1, wherein the at least one criterion of anchor device quality comprises at least one of:
a first distance from the UE to the first candidate anchor device being above a threshold distance; or
the first distance from the UE to the first candidate anchor device being a furthest distance of a plurality of second distances from the UE to a plurality of second anchor devices that comprise the first candidate anchor device; or
a positioning accuracy for the UE that is obtainable using a set of the plurality of second anchor devices that includes the first candidate anchor device.

Clause 3. The UE of clause 1, wherein the at least one criterion of anchor device quality comprises geometric diversity.

Clause 4. The UE of clause 1, wherein the at least one criterion of anchor device quality comprises a first distance from the UE to the first candidate anchor device and the processor is configured to report the measurement of the PRS based further on a plurality of second distances from the UE to a plurality of second anchor devices.

Clause 5. The UE of clause 4, wherein the PRS is a first PRS, the measurement is a first measurement, and wherein the processor is configured to report second measurements of second PRS corresponding to the plurality of second anchor devices based on each of the plurality of second distances from the UE to the plurality of second anchor devices being above a first threshold distance and below a second threshold distance.

Clause 6. The UE of clause 4, wherein the processor is configured to determine at least one of the plurality of second distances based on at least one measurement of at least one reference signal other than PRS.

Clause 7. The UE of clause 1, wherein the at least one criterion of anchor device quality comprises a first distance from the UE to the first candidate anchor device being above a first threshold distance and below a second threshold distance.

Clause 8. The UE of clause 1, wherein the at least one criterion of anchor device quality comprises the first candidate anchor device being disposed line of sight relative to the UE.

Clause 9. The UE of clause 1, wherein the indication of the spatial relationship between the UE and the first candidate anchor device comprises at least one of: a PRS measurement value, a location of the first candidate anchor device, or an explicit indication of a first distance from the UE to the first candidate anchor device.

Clause 10. The UE of clause 1, wherein the at least one criterion of anchor device quality comprises a geometric dilution of precision (GDOP) estimate for the UE that is obtainable using a plurality of second candidate anchor devices that includes the first candidate anchor device.

Clause 11. The UE of clause 10, wherein the processor is configured to report the measurement of the PRS based on the GDOP estimate being a minimum GDOP estimate of a plurality of GDOP estimates corresponding to a plurality of combinations of anchor devices.

Clause 12. The UE of clause 1, wherein the at least one criterion of anchor device quality comprises a first distance from the UE to the first candidate anchor device being above a threshold distance and the processor is configured to determine that the first distance is above the threshold distance based on the PRS having, at the UE, at least one of:

a time of arrival (ToA) above a ToA threshold; or
a pathloss above a pathloss threshold; or
a reference signal received power (RSRP) below an RSRP threshold; or
a signal-to-interference-plus-noise ratio (SINR) below a SINR threshold; or
a signal-to-noise ratio (SNR) below an SNR threshold.

Clause 13. The UE of clause 1, wherein the processor is configured to transmit a request to a network entity via the interface requesting scheduling of the PRS.

Clause 14. The UE of clause 1, wherein the at least one signal received via the interface is at least one of a downlink PRS received from a network entity or a sidelink PRS received from another UE.

Clause 15. A positioning reference signal measurement reporting method comprising:
determining, at a user equipment (UE) based on at least one signal received by the UE, an indication of a spatial relationship between the UE and a first candidate anchor device that is configured to transmit a positioning reference signal (PRS) wirelessly; and
reporting a measurement of the PRS based on the indication of the spatial relationship between the UE and the first candidate anchor device meeting at least one criterion of anchor device quality.

Clause 16. The positioning reference signal measurement reporting method of clause 15, wherein the at least one criterion of anchor device quality comprises at least one of:
a first distance from the UE to the first candidate anchor device being above a threshold distance; or
the first distance from the UE to the first candidate anchor device being a furthest distance of a plurality of second distances from the UE to a plurality of second anchor devices that include the first candidate anchor device; or
a positioning accuracy for the UE that is obtainable using a set of the plurality of second anchor devices that includes the first candidate anchor device.

Clause 17. The positioning reference signal measurement reporting method of clause 15, wherein the at least one criterion of anchor device quality comprises geometric diversity of the first candidate anchor device relative to at least one other anchor device.

Clause 18. The positioning reference signal measurement reporting method of clause 15, wherein the at least one criterion of anchor device quality comprises a first distance from the UE to the first candidate anchor device and reporting the measurement of the PRS is further based on a plurality of second distances from the UE to a plurality of second anchor devices.

Clause 19. The positioning reference signal measurement reporting method of clause 18, wherein the PRS is a first PRS, the measurement is a first measurement, and wherein the positioning reference signal measurement reporting method comprises reporting second measurements of second PRS corresponding to the plurality of second anchor devices based on each of the plurality of second distances from the UE to the plurality of second anchor devices being above a first threshold distance and below a second threshold distance.

Clause 20. The positioning reference signal measurement reporting method of clause 18, further comprising determining at least one of the plurality of second distances based on at least one measurement of at least one reference signal other than PRS.

Clause 21. The positioning reference signal measurement reporting method of clause 15, wherein the at least one criterion of anchor device quality comprises the first candidate anchor device being above a first threshold distance and below a second threshold distance.

Clause 22. The positioning reference signal measurement reporting method of clause 15, wherein the at least one criterion of anchor device quality comprises the first candidate anchor device being disposed line of sight relative to the UE.

Clause 23. The positioning reference signal measurement reporting method of clause 15, wherein the indication of the spatial relationship between the UE and the first candidate anchor device comprises at least one of: a PRS measurement value, a location of the first candidate anchor device, or an explicit indication of a first distance from the UE to the first candidate anchor device.

Clause 24. The positioning reference signal measurement reporting method of clause 15, wherein the at least one criterion of anchor device quality comprises a geometric dilution of precision (GDOP) estimate for the UE that is obtainable using a plurality of second candidate anchor devices that includes the first candidate anchor device.

Clause 25. The positioning reference signal measurement reporting method of clause 24, wherein reporting the measurement of the PRS comprises reporting the measurement of the PRS based on the GDOP estimate being a minimum GDOP estimate of a plurality of GDOP estimates corresponding to a plurality of combinations of anchor devices.

Clause 26. The positioning reference signal measurement reporting method of clause 15, wherein the at least one criterion of anchor device quality comprises a first distance from the UE to the first candidate anchor device being above a threshold distance, and the positioning reference signal measurement reporting method further comprises determining that the first distance is above the threshold distance based on the PRS having, at the UE, at least one of:
a time of arrival (ToA) above a ToA threshold; or
a pathloss above a pathloss threshold; or
a reference signal received power (RSRP) below an RSRP threshold; or
a signal-to-interference-plus-noise ratio (SINR) below a SINR threshold; or
a signal-to-noise ratio (SNR) below an SNR threshold.

Clause 27. The positioning reference signal measurement reporting method of clause 15, further comprising requesting a network entity to schedule the PRS.

Clause 28. The positioning reference signal measurement reporting method of clause 15, wherein the at least one signal is at least one of a downlink PRS received from a network entity or a sidelink PRS received from another UE.

Clause 29. A user equipment (UE) comprising:
means for determining, based on at least one signal received by the UE, an indication of a spatial relationship between the UE and a first candidate anchor device that is configured to transmit a positioning reference signal (PRS) wirelessly; and
means for reporting a measurement of the PRS based on the indication of the spatial relationship between the UE and the first candidate anchor device meeting at least one criterion of anchor device quality.

Clause 30. The UE of clause 29, wherein the at least one criterion of anchor device quality comprises at least one of:
a first distance from the UE to the first candidate anchor device being above a threshold distance; or
the first distance from the UE to the first candidate anchor device being a furthest distance of a plurality of second distances from the UE to a plurality of second anchor devices that include the first candidate anchor device; or a positioning accuracy for the UE that is obtainable using a set of the plurality of second anchor devices that includes the first candidate anchor device.

Clause 31. The UE of clause 29, wherein the at least one criterion of anchor device quality comprises geometric diversity of the first candidate anchor device relative to at least one other anchor device.

Clause 32. The UE of clause 29, wherein the at least one criterion of anchor device quality comprises a first distance from the UE to the first candidate anchor device and the means for reporting the measurement of the PRS comprise means for reporting the measurement of the PRS based further on a plurality of second distances from the UE to a plurality of second anchor devices.

Clause 33. The UE of clause 32, wherein the PRS is a first PRS, the measurement is a first measurement, and wherein the UE comprises means for reporting second measurements of second PRS corresponding to the plurality of second anchor devices based on each of the plurality of second distances from the UE to the plurality of second anchor devices being above a first threshold distance and below a second threshold distance.

Clause 34. The UE of clause 32, further comprising means for determining at least one of the plurality of second distances based on at least one measurement of at least one reference signal other than PRS.

Clause 35. The UE of clause 29, wherein the at least one criterion of anchor device quality comprises a first distance from the UE to the first candidate anchor device being above a first threshold distance and below a second threshold distance.

Clause 36. The UE of clause 29, wherein the at least one criterion of anchor device quality comprises the first candidate anchor device being disposed line of sight relative to the UE.

Clause 37. The UE of clause 29, wherein the indication of the spatial relationship between the UE and the first candidate anchor device comprises at least one of: a PRS measurement value, a location of the first candidate anchor device, or an explicit indication of a first distance from the UE to the first candidate anchor device.

Clause 38. The UE of clause 29, wherein the at least one criterion of anchor device quality comprises a geometric dilution of precision (GDOP) estimate for the UE that is obtainable using a plurality of second candidate anchor devices that includes the first candidate anchor device.

Clause 39. The UE of clause 38, wherein the means for reporting the measurement of the PRS comprise means for reporting the measurement of the PRS based on the GDOP estimate being a minimum GDOP estimate of a plurality of GDOP estimates corresponding to a plurality of combinations of anchor devices.

Clause 40. The UE of clause 29, wherein the at least one criterion of anchor device quality comprises a first distance from the UE to the first candidate anchor device being above a threshold distance, and the UE further comprises means for determining that the first distance is above the threshold distance based on the PRS having, at the UE, at least one of:
 a time of arrival (ToA) above a ToA threshold; or
 a pathloss above a pathloss threshold; or
 a reference signal received power (RSRP) below an RSRP threshold; or
 a signal-to-interference-plus-noise ratio (SINR) below a SINR threshold; or
 a signal-to-noise ratio (SNR) below an SNR threshold.

Clause 41. The UE of clause 29, further comprising means for requesting a network entity to schedule the PRS.

Clause 42. The UE of clause 29, wherein the at least one signal is at least one of a downlink PRS received from a network entity or a sidelink PRS received from another UE.

Clause 43. A non-transitory, processor-readable storage medium comprising processor-readable instructions configured to cause a processor, of a user equipment (UE), to:
 determine, based on at least one signal received by the UE, an indication of a spatial relationship between the UE and a first candidate anchor device that is configured to transmit a positioning reference signal (PRS) wirelessly; and
 report a measurement of the PRS based on the indication of the spatial relationship between the UE and the first candidate anchor device meeting at least one criterion of anchor device quality.

Clause 44. The storage medium of clause 43, wherein the at least one criterion of anchor device quality comprises at least one of:
 a first distance from the UE to the first candidate anchor device being above a threshold distance; or
 the first distance from the UE to the first candidate anchor device being a furthest distance of a plurality of second distances from the UE to a plurality of second anchor devices that include the first candidate anchor device; or
 a positioning accuracy for the UE that is obtainable using a set of the plurality of second anchor devices that includes the first candidate anchor device.

Clause 45. The storage medium of clause 43, wherein the at least one criterion of anchor device quality comprises geometric diversity of the first candidate anchor device relative to at least one other anchor device.

Clause 46. The storage medium of clause 43, wherein the at least one criterion of anchor device quality comprises a first distance from the UE to the first candidate anchor device and the processor-readable instructions configured to cause the processor to report the measurement of the PRS comprise processor-readable instruction configured to cause the processor to report the measurement of the PRS based further on a plurality of second distances from the UE to a plurality of second anchor devices.

Clause 47. The storage medium of clause 46, wherein the PRS is a first PRS, the measurement is a first measurement, and wherein the storage medium comprises processor-readable instructions configured to cause the processor to report second measurements of second PRS corresponding to the plurality of second anchor devices based on each of the plurality of second distances from the UE to the plurality of second anchor devices being above a first threshold distance and below a second threshold distance.

Clause 48. The storage medium of clause 46, further comprising processor-readable instructions configured to cause the processor to determine at least one of the plurality of second distances based on at least one measurement of at least one reference signal other than PRS.

Clause 49. The storage medium of clause 43, wherein the at least one criterion of anchor device quality comprises a first distance from the UE to the first candidate anchor device being above a first threshold distance and below a second threshold distance.

Clause 50. The storage medium of clause 43, wherein the at least one criterion of anchor device quality comprises the first candidate anchor device being disposed line of sight relative to the UE.

Clause 51. The storage medium of clause 43, wherein the indication of the spatial relationship between the UE and the first candidate anchor device comprises at least one of: a PRS measurement value, a location of the first candidate anchor device, or an explicit indication of a first distance from the UE to the first candidate anchor device.

Clause 52. The storage medium of clause 43, wherein the at least one criterion of anchor device quality comprises a geometric dilution of precision (GDOP) estimate for the UE that is obtainable using a plurality of second candidate anchor devices that includes the first candidate anchor device.

Clause 53. The storage medium of clause 52, wherein the processor-readable instructions configured to cause the processor to report the measurement of the PRS comprise processor-readable instructions configured to cause the processor to report the measurement of the PRS based on the GDOP estimate being a minimum GDOP estimate of a plurality of GDOP estimates corresponding to a plurality of combinations of anchor devices.

Clause 54. The storage medium of clause 43, wherein the at least one criterion of anchor device quality comprises a first distance from the UE to the first candidate anchor device being above a threshold distance, and the storage medium further comprises processor-readable instructions configured to cause the processor to determine that the first distance is above the threshold distance based on the PRS having, at the UE, at least one of:
  a time of arrival (ToA) above a ToA threshold; or
  a pathloss above a pathloss threshold; or
  a reference signal received power (RSRP) below an RSRP threshold; or
  a signal-to-interference-plus-noise ratio (SINR) below a SINR threshold; or
  a signal-to-noise ratio (SNR) below an SNR threshold.

Clause 55. The storage medium of clause 43, further comprising processor-readable instructions configured to cause the processor to request a network entity to schedule the PRS.

Clause 56. The storage medium of clause 43, wherein the at least one signal is at least one of a downlink PRS received from a network entity or a sidelink PRS received from another UE.

Clause 57. A network entity comprising:
  an interface;
  a memory; and
  a processor communicatively coupled to the interface and the memory and configured to transmit a positioning reference signal message to a target user equipment via the interface based on one or more spatial relationships between the target user equipment and one or more first anchor devices meeting one or more criteria of anchor device quality, the positioning reference signal message comprising a request for the target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof.

Clause 58. The network entity of clause 57, wherein the one or more criteria of anchor device quality comprise:
  the one or more first anchor devices being disposed furthest from the target user equipment from among a plurality of second anchor devices including the one or more first anchor devices; or
  a distance between a respective one of the one or more first anchor devices and the target user equipment being greater than a threshold distance; or
  the one or more first anchor devices being disposed relative to the target user equipment to provide at least a desired positioning accuracy for the target user equipment.

Clause 59. The network entity of clause 57, wherein the processor is configured to transmit the positioning reference signal message to the target user equipment to request the target user equipment to report the one or more positioning reference signal measurements in descending order of distance of the one or more first anchor devices from the target user equipment.

Clause 60. The network entity of clause 59, wherein the processor is configured to transmit the positioning reference signal message to the target user equipment to request the target user equipment to report the one or more positioning reference signal measurements in one of ascending order of reference signal received power of the one or more positioning reference signals, ascending order of signal-to-interference-plus-noise ratio of the one or more positioning reference signals, ascending order of signal-to-noise ratio of the one or more positioning reference signals, or descending order of time of arrival of the one or more positioning reference signals.

Clause 61. The network entity of clause 57, wherein the processor is configured to transmit the positioning reference signal message to the target user equipment to request the target user equipment to report the one or more positioning reference signal measurements based on the one or more positioning reference signals having, at the target user equipment, at least one of:
  a time of arrival (ToA) above a ToA threshold; or
  a pathloss above a pathloss threshold; or
  a reference signal received power (RSRP) below an RSRP threshold; or
  a signal-to-interference-plus-noise ratio (SINR) below a SINR threshold; or
  a signal-to-noise ratio (SNR) below an SNR threshold.

Clause 62. The network entity of clause 57, wherein the one or more positioning reference signals are one or more first positioning reference signals, the one or more positioning reference signal measurements are one or more first positioning reference signal measurements, and wherein the processor is configured to schedule positioning reference signal transfer between the target user equipment and the one or more first anchor devices based on one or more second positioning reference signal measurements of one or more second positioning reference signals transferred with the target user equipment.

Clause 63. The network entity of clause 57, wherein the processor is configured to schedule positioning reference signal transfer between the target user equipment and the one or more first anchor devices based on at least one of a previous position estimate for the target user equipment or a predicted position estimate for the target user equipment.

Clause 64. A method for use in positioning a user equipment, the method comprising:
  transmitting, from a network entity, a positioning reference signal message to a target user equipment based on one or more spatial relationships between the target user equipment and one or more first anchor devices meeting one or more criteria of anchor device quality, the positioning reference signal message comprising a request for the target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof.

Clause 65. The method of clause 64, wherein the one or more criteria of anchor device quality comprise:

the one or more first anchor devices being disposed furthest from the target user equipment from among a plurality of second anchor devices including the one or more first anchor devices; or a distance between a respective one of the one or more first anchor devices and the target user equipment being greater than a threshold distance; or the one or more first anchor devices being disposed relative to the target user equipment to provide at least a desired positioning accuracy for the target user equipment.

Clause 66. The method of clause 64, wherein transmitting the positioning reference signal message comprises transmitting the positioning reference signal message to the target user equipment to request the target user equipment to report the one or more positioning reference signal measurements in descending order of distance of the one or more first anchor devices from the target user equipment.

Clause 67. The method of clause 66, wherein transmitting the positioning reference signal message comprises transmitting the positioning reference signal message to the target user equipment to request the target user equipment to report the one or more positioning reference signal measurements in one of ascending order of reference signal received power of the one or more positioning reference signals, ascending order of signal-to-interference-plus-noise ratio of the one or more positioning reference signals, ascending order of signal-to-noise ratio of the one or more positioning reference signals, or descending order of time of arrival of the one or more positioning reference signals.

Clause 68. The method of clause 64, wherein transmitting the positioning reference signal message comprises transmitting the positioning reference signal message to the target user equipment to request the target user equipment to report the one or more positioning reference signal measurements based on the one or more positioning reference signals having, at the target user equipment, at least one of:

a time of arrival (ToA) above a ToA threshold; or a pathloss above a pathloss threshold; or a reference signal received power (RSRP) below an RSRP threshold; or a signal-to-interference-plus-noise ratio (SINR) below a SINR threshold; or a signal-to-noise ratio (SNR) below an SNR threshold.

Clause 69. The method of clause 64, wherein the one or more positioning reference signals are one or more first positioning reference signals, the one or more positioning reference signal measurements are one or more first positioning reference signal measurements, and wherein the method comprises scheduling positioning reference signal transfer between the target user equipment and the one or more first anchor devices based on one or more second positioning reference signal measurements of one or more second positioning reference signals transferred with the target user equipment.

Clause 70. The method of clause 64, further comprising scheduling positioning reference signal transfer between the target user equipment and the one or more first anchor devices based on at least one of a previous position estimate for the target user equipment or a predicted position estimate for the target user equipment.

Clause 71. A network entity comprising:

means for determining a positioning reference signal message comprising a request for a target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof; and means for transmitting the positioning reference signal message to the target user equipment based on one or more spatial relationships between the target user equipment and the one or more first anchor devices meeting one or more criteria of anchor device quality.

Clause 72. The network entity of clause 71, wherein the one or more criteria of anchor device quality comprise:

the one or more first anchor devices being disposed furthest from the target user equipment from among a plurality of second anchor devices including the one or more first anchor devices; or a distance between a respective one of the one or more first anchor devices and the target user equipment being greater than a threshold distance; or the one or more first anchor devices being disposed relative to the target user equipment to provide at least a desired positioning accuracy for the target user equipment.

Clause 73. The network entity of clause 71, wherein the means for determining the positioning reference signal message comprise means for determining the positioning reference signal message to request the target user equipment to report the one or more positioning reference signal measurements in descending order of distance of the one or more first anchor devices from the target user equipment.

Clause 74. The network entity of clause 73, wherein the means for determining the positioning reference signal message comprise means for determining the positioning reference signal message to request the target user equipment to report the one or more positioning reference signal measurements in one of ascending order of reference signal received power of the one or more positioning reference signals, ascending order of signal-to-interference-plus-noise ratio of the one or more positioning reference signals, ascending order of signal-to-noise ratio of the one or more positioning reference signals, or descending order of time of arrival of the one or more positioning reference signals.

Clause 75. The network entity of clause 71, wherein the means for determining the positioning reference signal message comprise means for determining the positioning reference signal message to request the target user equipment to report the one or more positioning reference signal measurements based on the one or more positioning reference signals having, at the target user equipment, at least one of:

a time of arrival (ToA) above a ToA threshold; or a pathloss above a pathloss threshold; or a reference signal received power (RSRP) below an RSRP threshold; or a signal-to-interference-plus-noise ratio (SINR) below a SINR threshold; or a signal-to-noise ratio (SNR) below an SNR threshold.

Clause 76. The network entity of clause 71, wherein the one or more positioning reference signals are one or more first positioning reference signals, the one or more positioning reference signal measurements are one or more first positioning reference signal measurements, and wherein the network entity comprises means for scheduling positioning reference signal transfer between the target user equipment and the one or more first anchor devices based on one or more second positioning reference signal measurements of one or more second positioning reference signals transferred with the target user equipment.

Clause 77. The network entity of clause 71, further comprising means for scheduling positioning reference signal transfer between the target user equipment and the one or more first anchor devices based on at least one of a previous position estimate for the target user equipment or a predicted position estimate for the target user equipment.

Clause 78. A non-transitory, processor-readable storage medium comprising processor-readable instructions configured to cause a processor, of a network entity, to:

transmit a positioning reference signal message to a target user equipment based on one or more spatial relationships between the target user equipment and one or more first anchor devices meeting one or more criteria of anchor device quality, the positioning reference signal message comprising a request for the target user equipment to report one or more positioning reference signal measurements corresponding to one or more positioning reference signals corresponding to one or more first anchor devices, or a positioning reference signal schedule of positioning reference signal transfer between the target user equipment and the one or more first anchor devices, or a combination thereof.

Clause 79. The storage medium of clause 78, wherein the one or more criteria of anchor device quality comprise:

the one or more first anchor devices being disposed furthest from the target user equipment from among a plurality of second anchor devices including the one or more first anchor devices; or a distance between a respective one of the one or more first anchor devices and the target user equipment being greater than a threshold distance; or the one or more first anchor devices being disposed relative to the target user equipment to provide at least a desired positioning accuracy for the target user equipment.

Clause 80. The storage medium of clause 78, wherein the processor-readable instructions configured to cause the processor to transmit the positioning reference signal message comprise processor-readable instructions configured to cause the processor to transmit the positioning reference signal message to request the target user equipment to report the one or more positioning reference signal measurements in descending order of distance of the one or more first anchor devices from the target user equipment.

Clause 81. The storage medium of clause 80, wherein the processor-readable instructions configured to cause the processor to transmit the positioning reference signal message comprise processor-readable instructions configured to cause the processor to transmit the positioning reference signal message to request the target user equipment to report the one or more positioning reference signal measurements in one of ascending order of reference signal received power of the one or more positioning reference signals, ascending order of signal-to-interference-plus-noise ratio of the one or more positioning reference signals, ascending order of signal-to-noise ratio of the one or more positioning reference signals, or descending order of time of arrival of the one or more positioning reference signals.

Clause 82. The storage medium of clause 78, wherein the processor-readable instructions configured to cause the processor to transmit the positioning reference signal message comprise processor-readable instructions configured to cause the processor to transmit the positioning reference signal message to request the target user equipment to report the one or more positioning reference signal measurements based on the one or more positioning reference signals having, at the target user equipment, at least one of:

a time of arrival (ToA) above a ToA threshold; or a pathloss above a pathloss threshold; or a reference signal received power (RSRP) below an RSRP threshold; or a signal-to-interference-plus-noise ratio (SINR) below a SINR threshold; or a signal-to-noise ratio (SNR) below an SNR threshold.

Clause 83. The storage medium of clause 78, wherein the one or more positioning reference signals are one or more first positioning reference signals, the one or more positioning reference signal measurements are one or more first positioning reference signal measurements, and wherein the storage medium further comprises processor-readable instructions configured to cause the processor to schedule positioning reference signal transfer between the target user equipment and the one or more first anchor devices based on one or more second positioning reference signal measurements of one or more second positioning reference signals transferred with the target user equipment.

Clause 84. The storage medium of clause 78, further comprising processor-readable instructions configured to cause the processor to schedule positioning reference signal transfer between the target user equipment and the one or more first anchor devices based on at least one of a previous position estimate for the target user equipment or a predicted position estimate for the target user equipment.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
an interface;
a memory; and
a processor communicatively coupled to the interface and the memory and configured to:
    determine, based on at least one signal received via the interface, an indication of a spatial relationship between the UE and a first candidate anchor device that is configured to transmit a positioning reference signal (PRS) wirelessly; and
    report a measurement of the PRS based on the indication of the spatial relationship between the UE and the first candidate anchor device meeting at least one criterion of anchor device quality, wherein the at least one criterion of anchor device quality comprises geometric diversity.

2. The UE of claim 1, wherein the at least one criterion of anchor device quality comprises at least one of:
a first distance from the UE to the first candidate anchor device being above a threshold distance; or
the first distance from the UE to the first candidate anchor device being a furthest distance of a plurality of second distances from the UE to a plurality of second anchor devices that comprise the first candidate anchor device; or a positioning accuracy for the UE that is obtainable using a set of the plurality of second anchor devices that includes the first candidate anchor device.

3. The UE of claim 1, wherein the at least one criterion of anchor device quality comprises a first distance from the UE to the first candidate anchor device and the processor is configured to report the measurement of the PRS based further on a plurality of second distances from the UE to a plurality of second anchor devices.

4. The UE of claim 3, wherein the PRS is a first PRS, the measurement is a first measurement, and wherein the processor is configured to report second measurements of second PRS corresponding to the plurality of second anchor devices based on each of the plurality of second distances from the UE to the plurality of second anchor devices being above a first threshold distance and below a second threshold distance.

5. The UE of claim 3, wherein the processor is configured to determine at least one of the plurality of second distances based on at least one measurement of at least one reference signal other than PRS.

6. The UE of claim 1, wherein the at least one criterion of anchor device quality comprises a first distance from the UE to the first candidate anchor device being above a first threshold distance and below a second threshold distance.

7. The UE of claim 1, wherein the at least one criterion of anchor device quality comprises the first candidate anchor device being disposed line of sight relative to the UE.

8. The UE of claim 1, wherein the indication of the spatial relationship between the UE and the first candidate anchor device comprises at least one of: a PRS measurement value, a location of the first candidate anchor device, or an explicit indication of a first distance from the UE to the first candidate anchor device.

9. The UE of claim 1, wherein the at least one criterion of anchor device quality comprises a geometric dilution of precision (GDOP) estimate for the UE that is obtainable using a plurality of second candidate anchor devices that includes the first candidate anchor device.

10. The UE of claim 9, wherein the processor is configured to report the measurement of the PRS based on the GDOP estimate being a minimum GDOP estimate of a plurality of GDOP estimates corresponding to a plurality of combinations of anchor devices.

11. The UE of claim 1, wherein the at least one criterion of anchor device quality comprises a first distance from the UE to the first candidate anchor device being above a threshold distance and the processor is configured to determine that the first distance is above the threshold distance based on the PRS having, at the UE, at least one of:
a time of arrival (ToA) above a ToA threshold; or
a pathloss above a pathloss threshold; or
a reference signal received power (RSRP) below an RSRP threshold; or
a signal-to-interference-plus-noise ratio (SINR) below a SINR threshold; or
a signal-to-noise ratio (SNR) below an SNR threshold.

12. The UE of claim 1, wherein the processor is configured to transmit a request to a network entity via the interface requesting scheduling of the PRS.

13. The UE of claim 1, wherein the at least one signal received via the interface is at least one of a downlink PRS received from a network entity or a sidelink PRS received from another UE.

14. A positioning reference signal measurement reporting method comprising:
determining, at a user equipment (UE) based on at least one signal received by the UE, an indication of a spatial relationship between the UE and a first candidate anchor device that is configured to transmit a positioning reference signal (PRS) wirelessly; and
reporting a measurement of the PRS based on the indication of the spatial relationship between the UE and the first candidate anchor device meeting at least one criterion of anchor device quality, wherein the at least one criterion of anchor device quality comprises geometric diversity of the first candidate anchor device relative to at least one other anchor device.

15. The positioning reference signal measurement reporting method of claim 14, wherein the at least one criterion of anchor device quality comprises at least one of:
a first distance from the UE to the first candidate anchor device being above a threshold distance; or
the first distance from the UE to the first candidate anchor device being a furthest distance of a plurality of second distances from the UE to a plurality of second anchor devices that include the first candidate anchor device; or
a positioning accuracy for the UE that is obtainable using a set of the plurality of second anchor devices that includes the first candidate anchor device.

16. The positioning reference signal measurement reporting method of claim 14, wherein the at least one criterion of anchor device quality comprises a first distance from the UE to the first candidate anchor device and reporting the measurement of the PRS is further based on a plurality of second distances from the UE to a plurality of second anchor devices.

17. The positioning reference signal measurement reporting method of claim 16, wherein the PRS is a first PRS, the measurement is a first measurement, and wherein the positioning reference signal measurement reporting method comprises reporting second measurements of second PRS corresponding to the plurality of second anchor devices based on each of the plurality of second distances from the UE to the plurality of second anchor devices being above a first threshold distance and below a second threshold distance.

18. The positioning reference signal measurement reporting method of claim 16, further comprising determining at least one of the plurality of second distances based on at least one measurement of at least one reference signal other than PRS.

19. The positioning reference signal measurement reporting method of claim 14, wherein the at least one criterion of anchor device quality comprises a first distance between the UE and the first candidate anchor device being above a first threshold distance and below a second threshold distance.

20. The positioning reference signal measurement reporting method of claim 14, wherein the at least one criterion of anchor device quality comprises the first candidate anchor device being disposed line of sight relative to the UE.

21. The positioning reference signal measurement reporting method of claim 14, wherein the indication of the spatial relationship between the UE and the first candidate anchor device comprises at least one of: a PRS measurement value, a location of the first candidate anchor device, or an explicit indication of a first distance from the UE to the first candidate anchor device.

22. The positioning reference signal measurement reporting method of claim 14, wherein the at least one criterion of anchor device quality comprises a geometric dilution of precision (GDOP) estimate for the UE that is obtainable using a plurality of second candidate anchor devices that includes the first candidate anchor device.

23. The positioning reference signal measurement reporting method of claim 22, wherein reporting the measurement of the PRS comprises reporting the measurement of the PRS based on the GDOP estimate being a minimum GDOP estimate of a plurality of GDOP estimates corresponding to a plurality of combinations of anchor devices.

24. The positioning reference signal measurement reporting method of claim 14, wherein the at least one criterion of anchor device quality comprises a first distance from the UE to the first candidate anchor device being above a threshold distance, and the positioning reference signal measurement reporting method further comprises determining that the first distance is above the threshold distance based on the PRS having, at the UE, at least one of:
- a time of arrival (ToA) above a ToA threshold; or
- a pathloss above a pathloss threshold; or
- a reference signal received power (RSRP) below an RSRP threshold; or
- a signal-to-interference-plus-noise ratio (SINR) below a SINR threshold; or
- a signal-to-noise ratio (SNR) below an SNR threshold.

25. The positioning reference signal measurement reporting method of claim 14, further comprising requesting a network entity to schedule the PRS.

26. The positioning reference signal measurement reporting method of claim 14, wherein the at least one signal is at least one of a downlink PRS received from a network entity or a sidelink PRS received from another UE.

27. A user equipment (UE) comprising:
- means for determining, based on at least one signal received by the UE, an indication of a spatial relationship between the UE and a first candidate anchor device that is configured to transmit a positioning reference signal (PRS) wirelessly; and
- means for reporting a measurement of the PRS based on the indication of the spatial relationship between the UE and the first candidate anchor device meeting at least one criterion of anchor device quality, wherein the at least one criterion of anchor device quality comprises geometric diversity.

28. A non-transitory, processor-readable storage medium comprising processor-readable instructions configured to cause a processor, of a user equipment (UE), to:
- determine, based on at least one signal received by the UE, an indication of a spatial relationship between the UE and a first candidate anchor device that is configured to transmit a positioning reference signal (PRS) wirelessly; and
- report a measurement of the PRS based on the indication of the spatial relationship between the UE and the first candidate anchor device meeting at least one criterion of anchor device quality, wherein the at least one criterion of anchor device quality comprises geometric diversity.

29. A user equipment (UE) comprising:
- an interface;
- a memory; and
- a processor communicatively coupled to the interface and the memory and configured to:
  - determine, based on at least one signal received via the interface, an indication of a spatial relationship between the UE and a first candidate anchor device that is configured to transmit a positioning reference signal (PRS) wirelessly; and
  - report a measurement of the PRS based on the indication of the spatial relationship between the UE and the first candidate anchor device meeting at least one criterion of anchor device quality, wherein the at least one criterion of anchor device quality comprises at least one of (i) geometric diversity, or (ii) a first distance from the UE to the first candidate anchor device being above a first threshold distance and below a second threshold distance, or (iii) the first candidate anchor device being disposed line of sight relative to the UE.

* * * * *